(12) United States Patent
Kuchi et al.

(10) Patent No.: US 11,949,475 B2
(45) Date of Patent: *Apr. 2, 2024

(54) METHOD OF SIGNAL PROCESSING BY A MASSIVE MIMO BASE STATION RECEIVER

(71) Applicant: WISIG NETWORKS PRIVATE LIMITED, Telangana (IN)

(72) Inventors: Kiran Kumar Kuchi, Hyderabad (IN); Saidhiraj Amuru, Hyderabad (IN)

(73) Assignee: WISIG NETWORKS PRIVATE LIMITED (IN)

(*) Notice: Subject to any disclaimer, the term of this patent is extended or adjusted under 35 U.S.C. 154(b) by 0 days.

This patent is subject to a terminal disclaimer.

(21) Appl. No.: 17/900,101

(22) Filed: Aug. 31, 2022

(65) Prior Publication Data

US 2022/0416859 A1 Dec. 29, 2022

Related U.S. Application Data

(63) Continuation of application No. 17/495,013, filed on Oct. 6, 2021, now Pat. No. 11,489,568.

(30) Foreign Application Priority Data

Oct. 26, 2020 (IN) .............................. 202041046686

(51) Int. Cl.
*H04L 5/12* (2006.01)
*H04B 7/0456* (2017.01)
*H04B 7/06* (2006.01)

(52) U.S. Cl.
CPC ......... *H04B 7/0473* (2013.01); *H04B 7/0626* (2013.01); *H04B 7/0639* (2013.01)

(58) Field of Classification Search
CPC .. H04B 7/0473; H04B 7/0626; H04B 7/0639; H04B 7/0417; H04B 7/0456; H04B 7/0452

(Continued)

(56) References Cited

U.S. PATENT DOCUMENTS 10,433,200 B2 * 10/2019 Lee .......................... H04L 5/00
2019/0246416 A1 * 8/2019 Park ...................... H04L 1/1671

FOREIGN PATENT DOCUMENTS

CA 3067267 A1 * 12/2018
CN WO2011160277 A1 * 12/2011

(Continued)

*Primary Examiner* — Helene E Tayong
(74) *Attorney, Agent, or Firm* — McAndrews, Held & Malloy, Ltd.

(57) ABSTRACT

Embodiments of the present disclosure provide a method of processing received signal using a massive MIMO base station (BS). The BS comprises a radio unit (RU), a distributed unit (DU) and an interface. The method comprises receiving a plurality of signals corresponding to the plurality of antennas, said signals comprises at least one of data signals, demodulation reference signals (DMRS) and sounding reference signals (SRS). The RU or DU performs a grouping operation on a subset of the plurality of signals corresponding to a subset of antennas to generate signal groups. The RU performs a first stage filtering on the signals associated with each group using group specific filters to obtain group specific filtered signals. The DU performs a second stage filtering on the group specific filtered signals to obtain second stage filtered signals.

39 Claims, 15 Drawing Sheets

(58) Field of Classification Search
USPC .......................................................... 375/262
See application file for complete search history.

(56) References Cited

FOREIGN PATENT DOCUMENTS

| | | | |
|---|---|---|---|
| JP | 2013526114 A | * | 6/2013 |
| SE | 3342219 B1 | * | 5/2019 |
| WO | WO2019229774 | * | 12/2019 |

* cited by examiner

METHOD OF SIGNAL PROCESSING BY A MASSIVE MIMO BASE STATION RECEIVER

This application is a continuation of U.S. application Ser. No. 17/495,013, filed Oct. 6, 2021, which also claims the benefit of Indian provisional application number 202041046686, filed on Oct. 26, 2020; which hereby incorporated by reference.

TECHNICAL FIELD

Embodiments of the present disclosure are related, in general to communication, but exclusively related to massive multiple input multiple output (MIMO) base station (BS).

BACKGROUND

FIG. 1 shows a traditional Radio Access Networks (RAN) architecture, typically deployed as a co-located architecture. As shown in FIG. 1, the RAN architecture includes Base station (BS), backhaul and core. The BS comprises remote radio head (RRH)/radio unit (RU) and base band unit (BBU). The RU comprises amplifiers, filters and an analog frontend components of a transceiver, and the BBU with the baseband modem were typically co-located either at the top or bottom of the cellular tower. When located at the bottom of the tower, RF cables from the antenna feeds at the top of the tower were used to connect to the units at the bottom of the tower. These methods typically had significant losses due to these RF cables and warranted special solutions.

FIG. 2 shows a centralized RAN architecture, wherein common public radio interface (CPRI), a protocol for IQ data transmission is used between the RRH and BBU via optical fiber. This architecture allowed the BBU unit to be located at a distant location from the cell tower in which case the CPRI cables had to be long such as few kilometers (kms) to support a centralized deployment A centralized RAN deployment further evolved to support a cloud-RAN deployment, which allowed the BBU to coordinate radio units across multiple sites, better coordinate interference across multiple sites and improve overall network throughput. The front haul (FH) was supported initially supported by CPRI. However, it was soon realized that CPRI has too much overhead and lot of bandwidth wastage even during idle times. Quickly, this was replaced by eCPRI standard (enhanced CPRI) which supports Ethernet based IP packet flows only when traffic is present, which is not point-to-point like CPRI. This architecture also allowed for the BBUs to be virtualized to be able to support on-demand services.

A cloud-RAN architecture evolved which could support more splits. The BBU itself is split into a real-time distributed unit (DU) and a non-real-time control unit (CU), where a single DU can source multiple RUs and a single CU can source multiple DUs. However, there is not a single place where the split between RU, DU and CU can be done in the entire protocol stack of a wireless network such as 4G and 5G.

FIG. 3 shows block diagram of possible splits using the various components of a wireless stack. Depending on the splits between the CU-DU and DU-RU, the bandwidth and latency requirements change in the entire design. This problem especially aggravates with the introduction of the massive MIMO solutions to enhance capacity and coverage. FIG. 4 shows DU-RU split with 5 potential split points. The bandwidth requirements on the DU-RU interface change from a mere 100 Mbps at split 6 to 250 Gbps at split 8 when multiple antennas, higher order modulations and 100 MHz bandwidth systems are considered. Hence, this requires a careful analysis and design of the entire wireless system.

The split is also commonly referred to as the low-PHY and high-PHY split. The low PHY is the portion closer to the radio and the high PHY is the one closer to the baseband. The low PHY portion is typically referred to as the RU and the high PHY portion as the DU. The high PHY does the baseband processing at bit level including FEC, and modulation mapping. The output of this is passed to a precoder module. The precoding module can be either in low-PHY or the high-PHY depending on the split used. Depending on where the precoding module is present the two nodes i.e., the DU and RU may have to communicate with each other the precoding vectors for the DL MIMO operation. Similarly, in the uplink the beamforming on the received vectors can be performed either in the high PHY or the low-PHY portions. Depending on when the split is and what operations are performed in each block, the DU-RU or the low-PHY and high-PHY blocks exchange information necessary for precoding and beamforming operations via the interface. If the beamforming is done in low-PHY, then the high-PHY must in advance send these beamforming vectors to the low-PHY which can be based on some reference signals. However, the low-PHY itself can design its own beamforming vectors then there is no need for any message exchange. The low-PHY then sends the beamformed received signals to the high PHY for further processing.

Modern designs have baseband and RF units split out in the form of distributed unit (DU) and radio unit (RU). The DU handles the baseband processing part and the RU handles the radio part including antennas, filters, ADCs and DACs. The output of the RUs is fed to the DUs for further processing. The DU and RU communicate with each other and typically the RU acts as a slave to the master DU. The DU may in turn communicate to the CU (central unit) which can house the scheduler in some designs or the DU itself may house the scheduler. The control from DU to RU may be sent via ORAN messages which includes the control plane and user plane messages among others.

Another RAN architecture that supports a vertical split along the various protocol layers and horizontal splits within a protocol layer to support control plane and user plane traffic separation is proposed by the ORAN alliance. This alliance narrowed down to split, between DU-RU and split 2 between CU and DU. They allow 2 variants of the devices in the 7.2 split based on where digital beamforming is performed. This architecture depends on the deployments chosen by a telecom operator. To support this deployment, eCPRI protocol is used and has been created various types of messages.

To accommodate this split, new interfaces defined as control plane, user plane, synchronization plane and management plane are defined. The CUS Plane is at least one of Control, User and Synchronization Plane which is configured to:
  Covers real-time control-plane communications between the DU and RU
  Covers user plane traffic in DL and UL between DU and RU
  Covers synchronization of the RU generally sources from the DU
  Uses Ethernet transport and eCPRI/IEEE 1914.3 radio application transport
  M-Plane: Management Plane
  Covers management of the Radio Unit (RU) as governed by the DU Provides all non-real-time control of the RU (Real time control uses the C-Plane)

Uses Ethernet (UDP/IP) transport

Different blocks such as modulation, scrambling, precoding, rate matching and the reverse operations for the uplink are split between the DU and RU as per the split option.

Depending on the number of the antennas at the RU side which is connected to the antennas, the DU can send beamforming vectors to the RU. The RU can apply beamforming vectors by itself as well. The DU-RU can exchange their capabilities at the startup. There is a S-plane based synchronization via PTP module on both sides and the grand-master clock to which the nodes synchronize. Based on the timeline, messages are exchanged. The messages between DU and RU can be compressed and sent to save BW. This is called IQ compression. Then the other node has to decompress before using the information. The messages are exchanged both DL and UL directions. In either case DU is the master and RU will be the slave.

A single user (SU)/multi user (MU) multiple input multiple output (MIMO) in uplink, a single user may employ multiple transmit antennas and transmit either single or multiple layers. The multiple layers mean multiple modulation data streams that are transmitted simultaneously. Such multi-layer transmission increases the total data rate per user when the channel conditions are favorable to allow reliable decoding of each layer.

In Single-layer SU-MIMO, single layer transmission is preferable under low SINR conditions while multiple layer transmission is desirable when SINR is high. The multiple antennas available at the BS will be used to coherently combine the signal outputs of the receiver antennas. Such receiver is commonly referred to as Maximal Ratio Combining (MRC) or matched-filter receiver. In some implementations, the interference that arises from the transmissions of users located in other cells can be mitigated/reduced by using interference suppression receivers such as IRC. These conventional receivers rely on an estimate of the CSI and an estimate of the noise and interference covariance matrix (NICM). Such estimates of CSI and NICM are generally acquired by using the reference signals that are transmitted along with the data. The proposed embodiments are applicable for 4G LTE and 5G NR cellular systems and the like.

In 5G NR, a slot typically comprises data/control information carrying OFDM symbols as well as reference signals that are also known as DMRS. The number of DMRS symbols are typically configurable. Two DMRS symbols configurations are common and even 3 symbol DMRS transmission is permitted by the 5G specifications. The duration of a slot is a function of subcarrier width and other system requirements. A slot of 0.5 ms duration with 30 KHz subcarrier spacing with a bandwidth of up to 100 MHz is commonly used in deployment scenarios. The carrier frequency is a configurable parameter. The specification supports FR1 frequencies in the sub 6 GHz range and use of above 6 GHz is designated as FR2. FIG. 5 shows a Frame structure for 5G NR. FIG. 6 shows a representation of a slot structure with SS block reference signals in a particular location as per the band, numerology, etc.

FIG. 7 shows an example DMRS configurations to support multiple layers in a slot. As shown in FIG. 7, which is an example DMRS configurations for 5G NR system in a slot. The DMRS can be configured in multiple locations in slots. The frequency domain tones are loaded based on the number of layers supported by the user in SU-MIMO and the number of users in MU-MIMO situation.

Common channels like SSB are beam formed using a common beam. User specific signals such as PDCCH, PDSCH, DMRS can be sent using user specific beams in the downlink. There are other channels such as CSI-RS, which may be sent in broadcast or user specific manner based on the configurations. The common beams can be sector beams or pre-defined beams or dynamically configured based on user locations among others.

FIG. 8 shows a block diagram representation of Multi-layer SU-MIMO. In Multi-layer SU-MIMO, the UE is allowed to transmit multiple layers only when the channel between the user and the BS is such that mutual interference between the layers can be eliminated at the receiver by use of receivers with user interference suppression ability. Examples of such receivers include IRC, MMSE, and MMSE-IRC, and non-linear receivers etc. When transmitting multiple layers, it uses a DMRS structure that facilitates estimation of CSI corresponding to each layer at the BS. The multiple layer DMRS configurations are shown previously. The multiple layer DMRS can be configured on different odd and even tones or on the same tones using CDM method. Depending on the same, the receiver must do the channel estimation.

FIG. 9 shows a block diagram representation of Multi-user MIMO. The Multi-user MIMO refers to a method where multiple users communicate with the BS simultaneously on the same time-frequency resource. Each user may use a single layer or multiple layers. In scenarios where the BS has a large number of antennas, it is possible to eliminate both the self-interference that arises due to the use of multiple layers by a given user and inter-user interference that is caused by the transmission of signals by multiple users at the same time. Examples of such receivers include IRC, MMSE, and MMSE-IRC, and non-linear receivers etc. that are specifically tailored for MU MIMO operation.

In current systems that use up to 8-antennas at the receiver the existing receiver techniques are capable of supporting SU or MU MIMO. However, when the number of receiver antennas becomes very large, use of standard receivers results in either very computational complexity or in some cases sub-optimal performance. There is a need to develop receivers with low-implementation complexity and high performance.

One embodiment of the present disclosure relates to a receiver processing in massive MIMO UL. Signals are received at the antenna array on NRx (for example 64) antennas. Depending on the number of ADCs/RF chains available in the receiver, the digital processing is performed in the base station. When 64 RF chains are available, the DU will have to send the baseband I/Q samples corresponding to the all the received signals to RU. The amount of fiber bandwidth (BW) required to send such large number of baseband I/Q samples becomes so high that the cost of the DU-RU interface becomes a limiting factor.

Therefore, there is a need for RU to condense the 64 antennas data into a lesser number before the I/Q samples of the condensed information is sent back to the DU. When the number of streams to be sent to DU is less than 64, then there are multiple ways to do this. However, an intelligent approach is required to ensure that the overall system performance is maximized. Some common approaches available to condense 64 antennas data into "L" streams are:

Down-select L out of 64 streams

Combine or add the 64/L antennas data akin to equal gain combining

DFT weights are applied on a subset of 64/L antennas and combines these signals to obtain "L" streams Intelligently select or combine using groups of antennas using various signal processing methods and send the resulting data to the DU For the above process, some of these combinations may be done in analog domain and some in digital domain. Alternatively, combining may be implemented in time domain or frequency domain. In case of frequency domain processing, the RU must at least perform the CP removal and FFT operations on the incoming streams of data.

A condensing process is also referred as the filtering process interchangeably may be identified by the RU itself or be indicated by the DU. Once the filtered signals at RU are sent to DU, the DU may filter them again for further processing. That is, the L streams in DU may be further filtered/processed using linear or non-linear processing to recover the actual necessary data streams which can be anywhere from 1 to L Conventional MMSE type equalizers process all 64 received streams into a single effective stream by maximizing the signal power interference and minimizing the noise-plus-interference.

The main challenge in condensing is to make sure that when received signals are mapped to streams, data and reference signal characteristics are not distorted to the extent that jeopardizes the data reception quality. Alternatively, the condensing is performed to ensure that the receiver system performance is maximized. This can be done by constructively combining data and reference signals and mitigating intra-cell (or other-cell) and inter-cell (or self) interference.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method of received signal processing by a massive multiple input multiple output (MIMO) base station (BS) is disclosed. The massive MIMO BS comprises a plurality of antennas, at least one radio unit (RU), at least one distributed unit (DU), an interface configured for a communication between the at least one RU and the at least one DU. The method comprises receiving, by the at least one RU, a plurality of signals corresponding to the plurality of antennas. The plurality of signals comprises at least one of data signals, demodulation reference signals (DMRS) and sounding reference signals (SRS). Also, the method comprises grouping, by the at least one RU and the at least one DU, a subset of the plurality of signals corresponding to a subset of antennas to a group, to generate a plurality of signal groups. The signals associated with each group is at least one of the data signals, the DMRS and the SRS. Further, the method comprises performing a first stage filtering, by the RU, on the plurality of signal groups associated with each group using one or more group specific filters to obtain one or more group specific filtered signals. The group specific filters are determined using at least one of the signals associated with the group, and a set of values communicated by the DU to the RU, wherein said set of values are determined by the DU based on SRS or predetermined values. Furthermore, the method comprises performing a second stage filtering, by the DU, on the one or more group specific filtered signals associated with a plurality of the signal groups to obtain one or more second stage filtered signals.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 1:
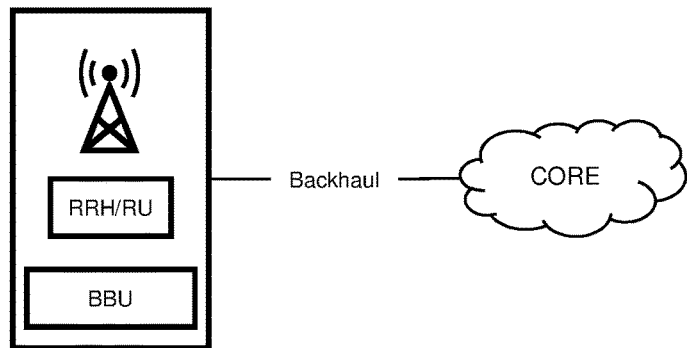
FIG. 1 shows a traditional Radio Access Networks (RAN) architecture, typically looked as a collocated architecture.
Figure 2:
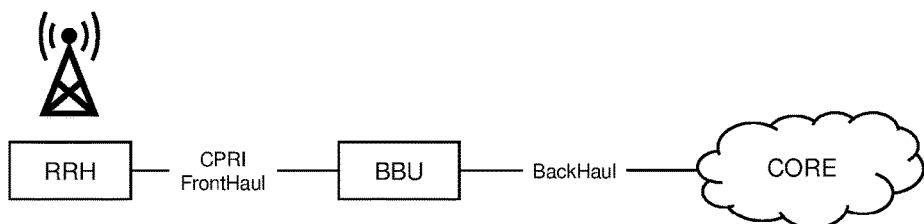
FIG. 2 shows a centralized RAN architecture.
Figure 3:
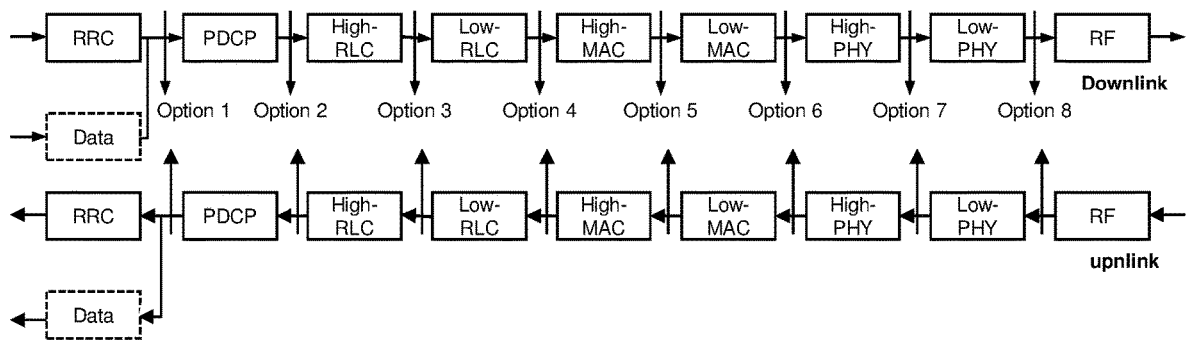
FIG. 3 shows block diagram of possible splits using the various components of a wireless stack.
Figure 4:
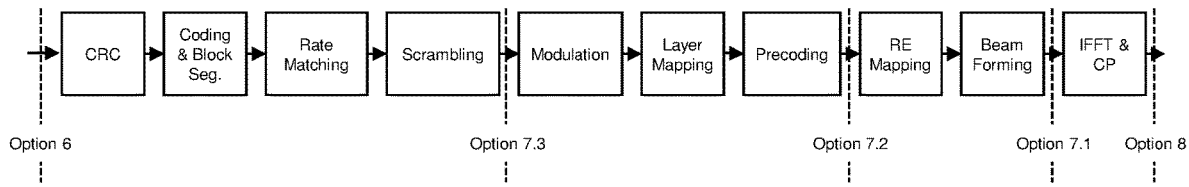
FIG. 4 shows DU-RU split with 5 potential split points.
Figure 5:
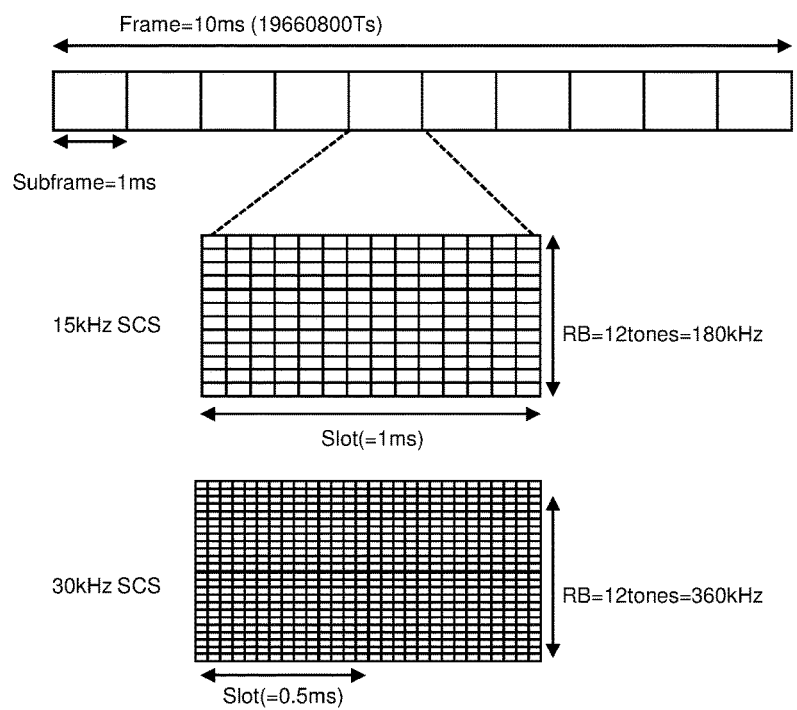
FIG. 5 shows a Frame structure for 5G NR.
Figure 6:
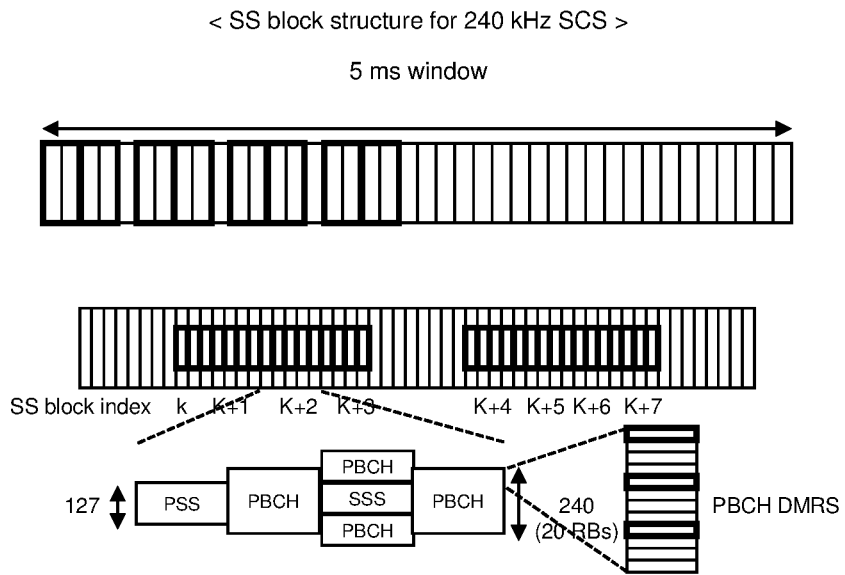
FIG. 6 shows a representation of a slot structure with SS block reference signal.
Figure 7:
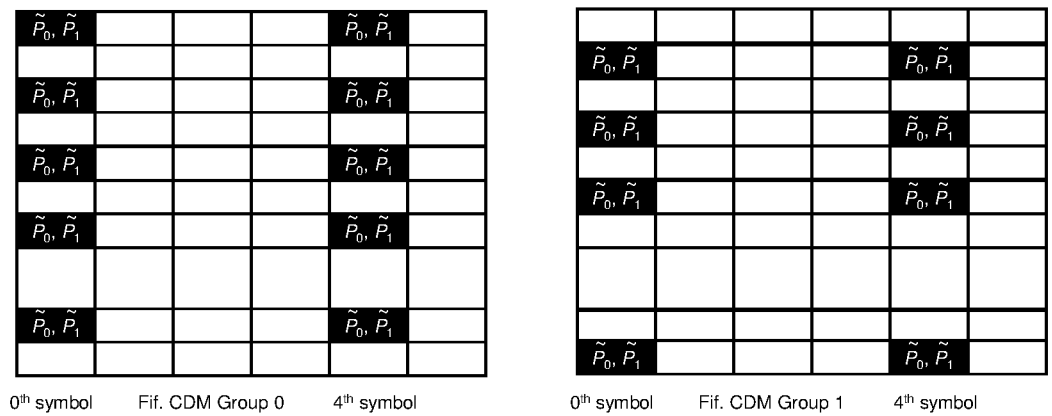
FIG. 7 shows an example DMRS configurations to support multiple layers in a slot.
Figure 8:
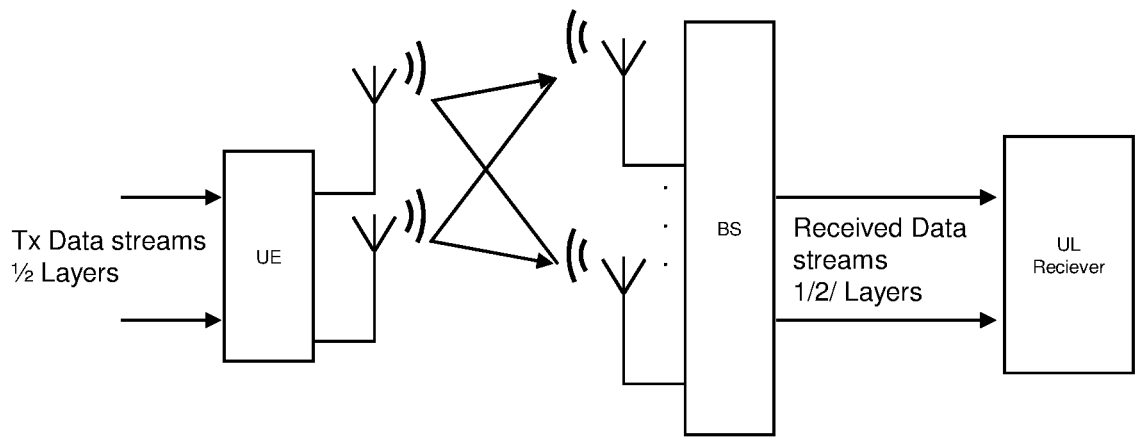
FIG. 8 shows a block diagram representation of Multi-layer SU-MIMO.
Figure 9:
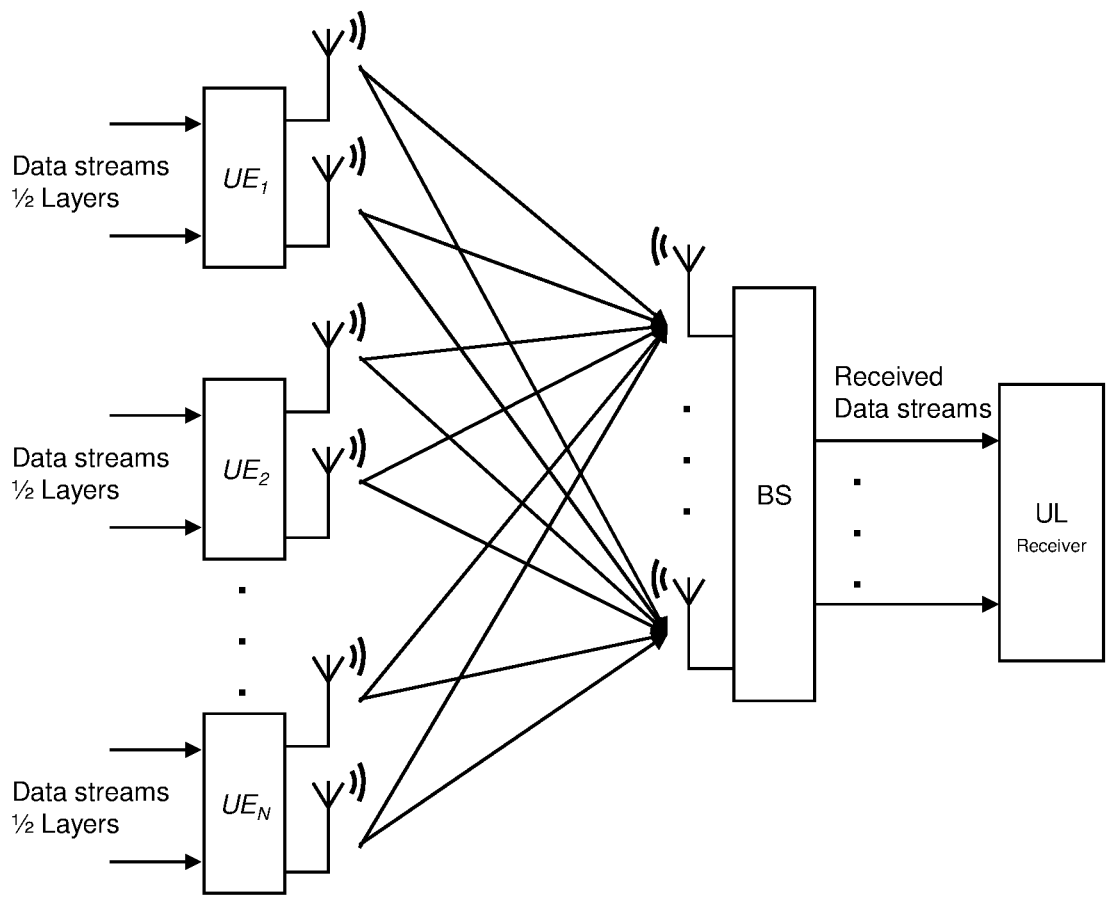
FIG. 9 shows a block diagram representation of Multi-user MIMO.
Figure 10:
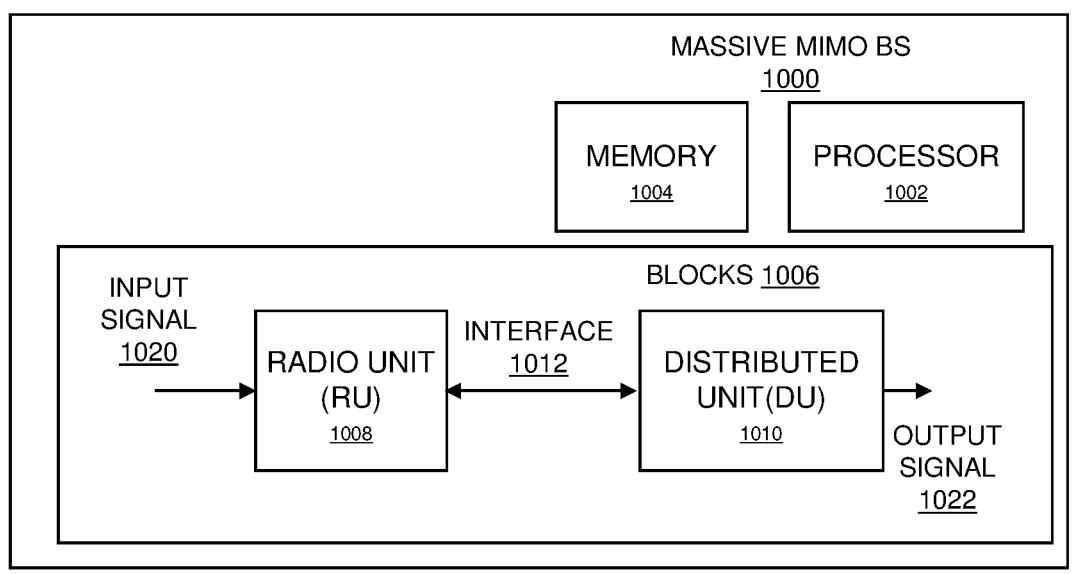
Figure 11:
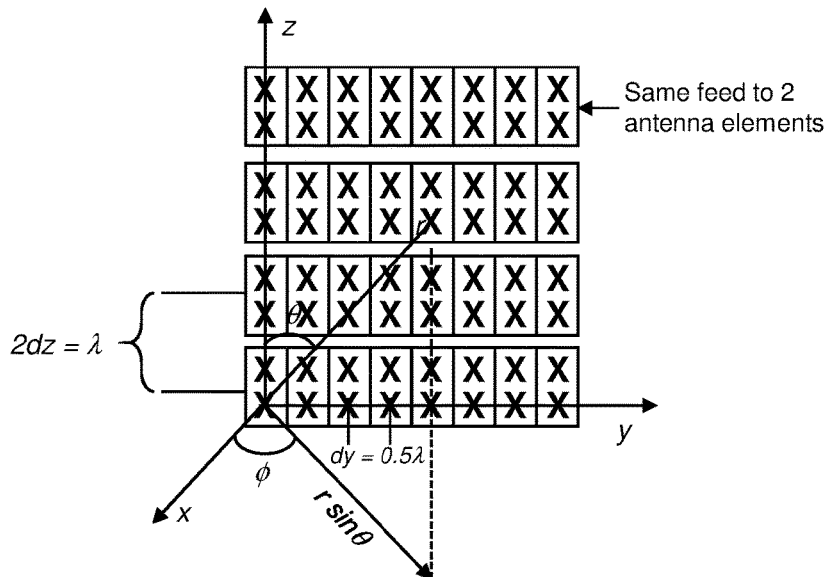
Figure 12:
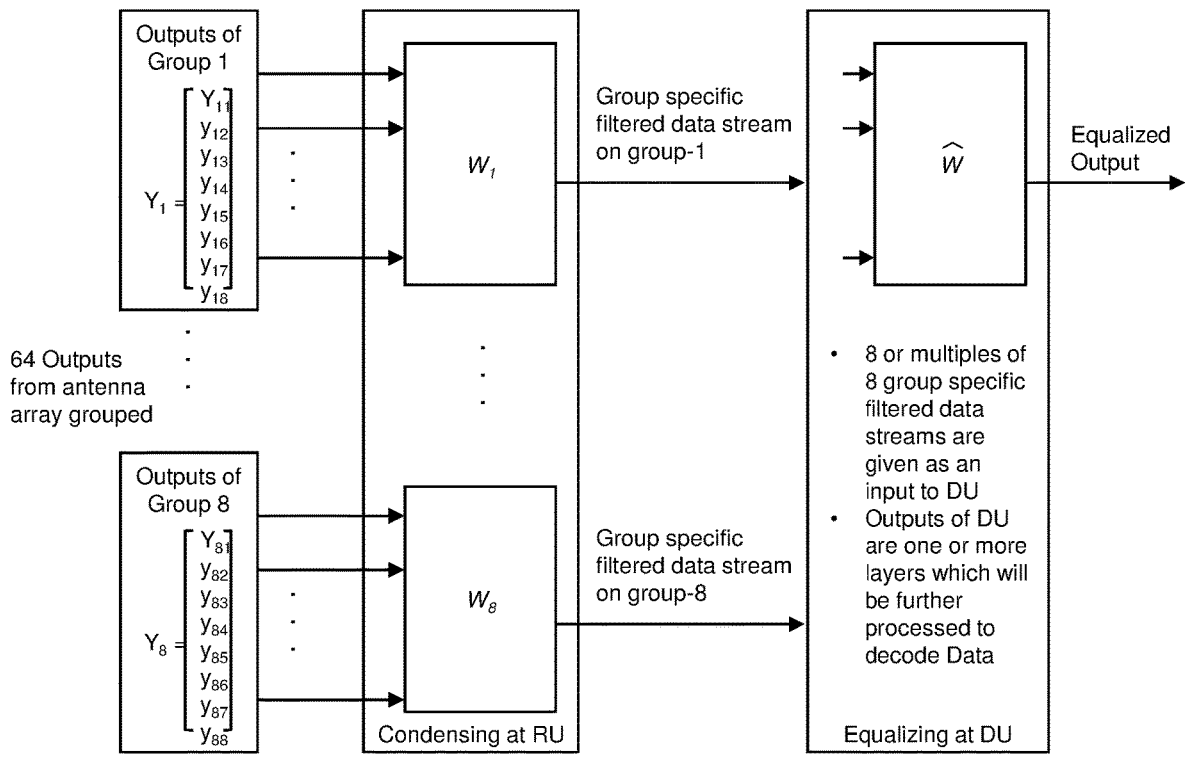
Figure 13:
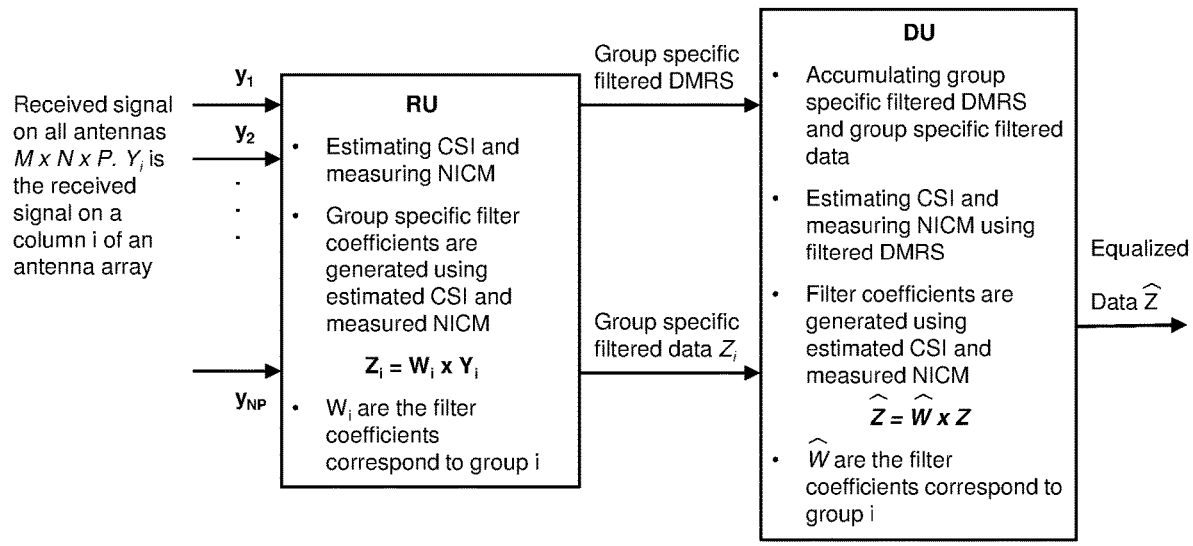
Figure 14:
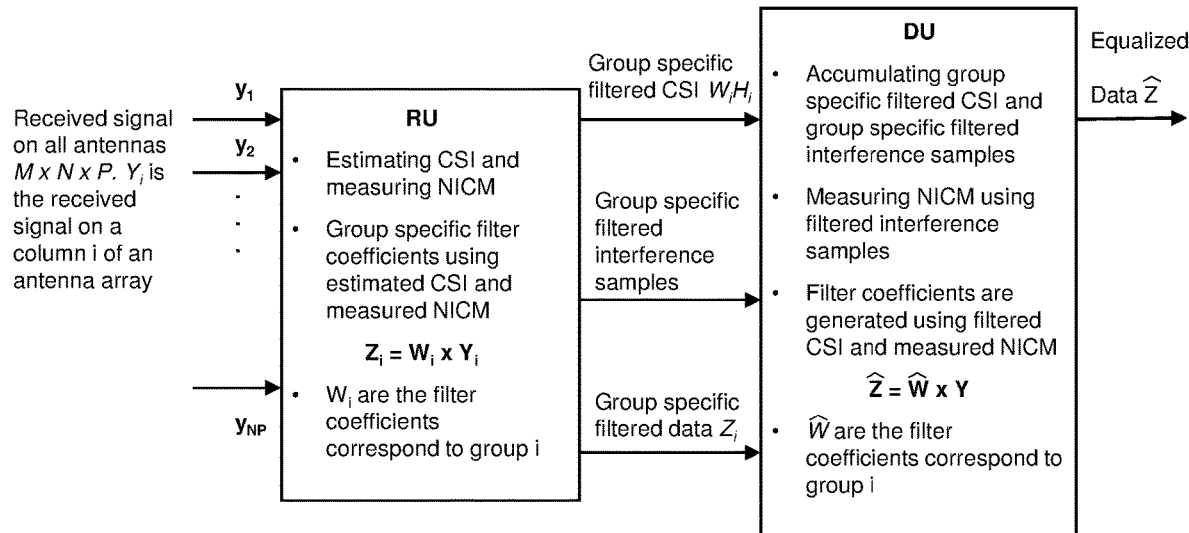
Figure 15A:
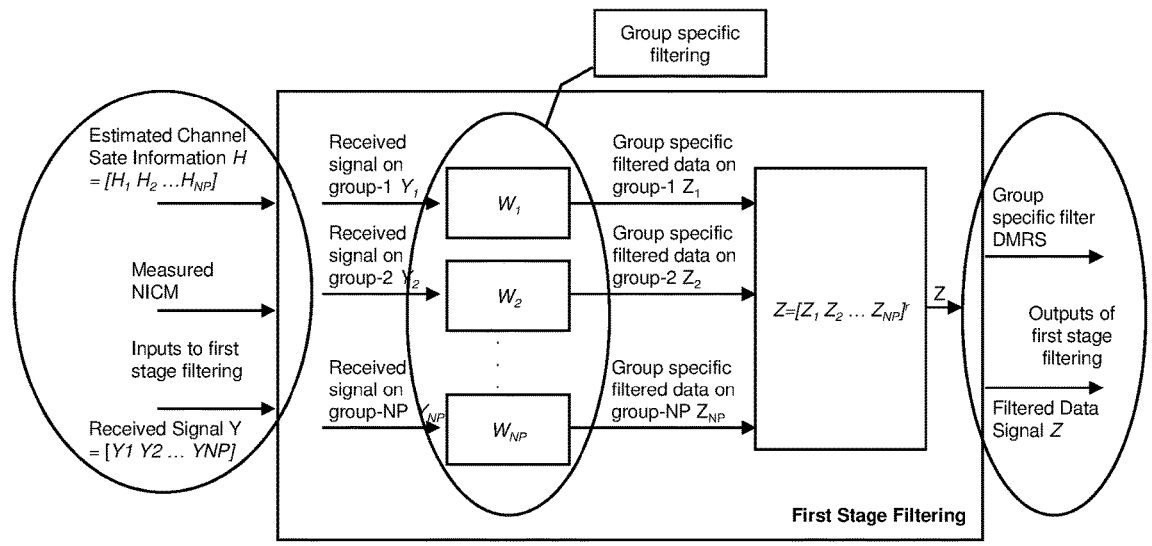
Figure 15B:
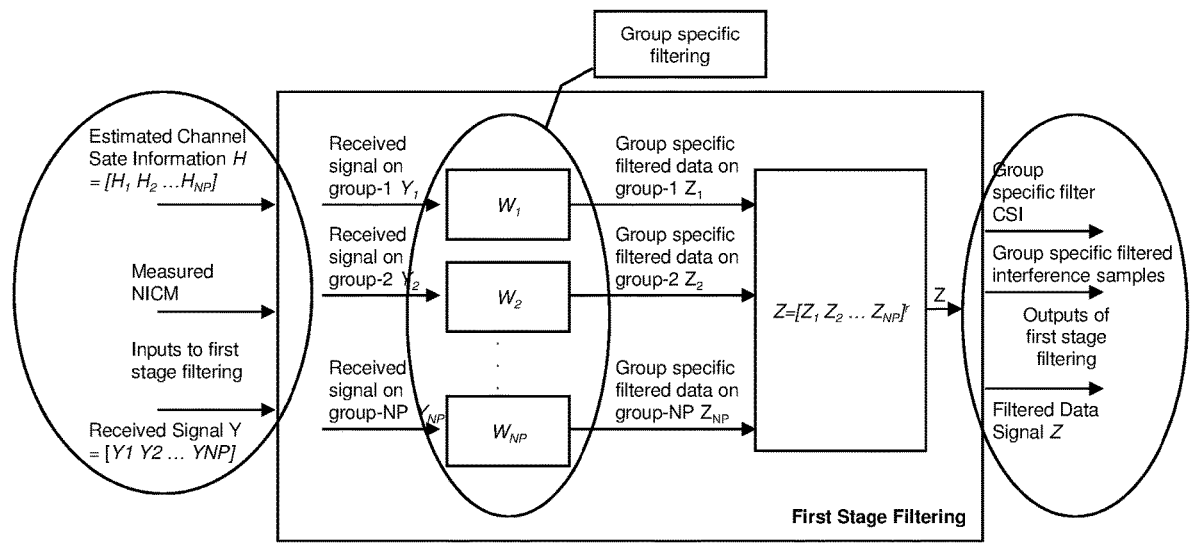
Figure 16A:
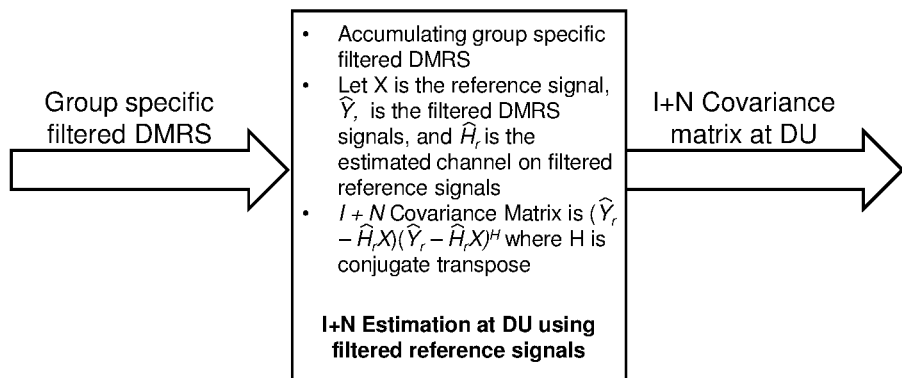
Figure 16B:
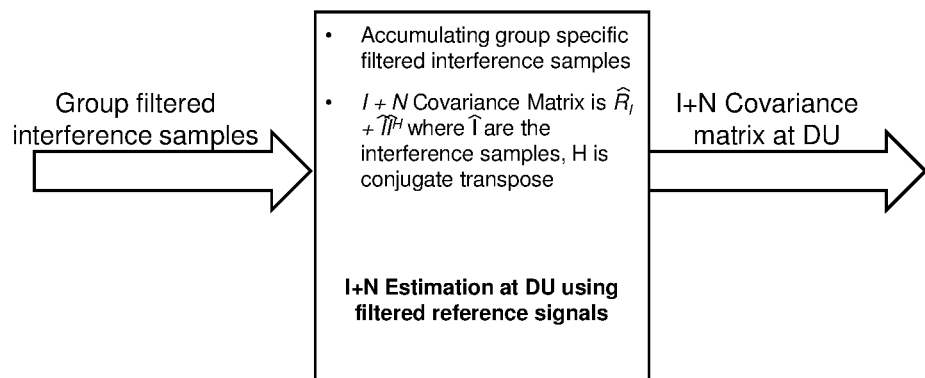
Figure 17:
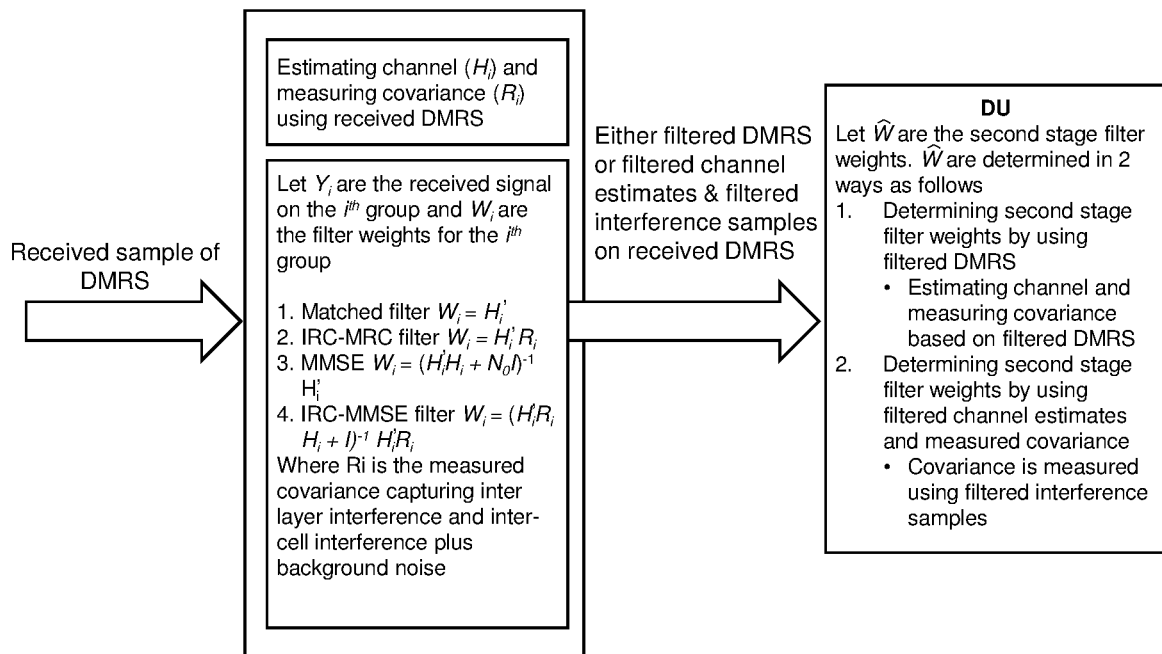
Figure 18:
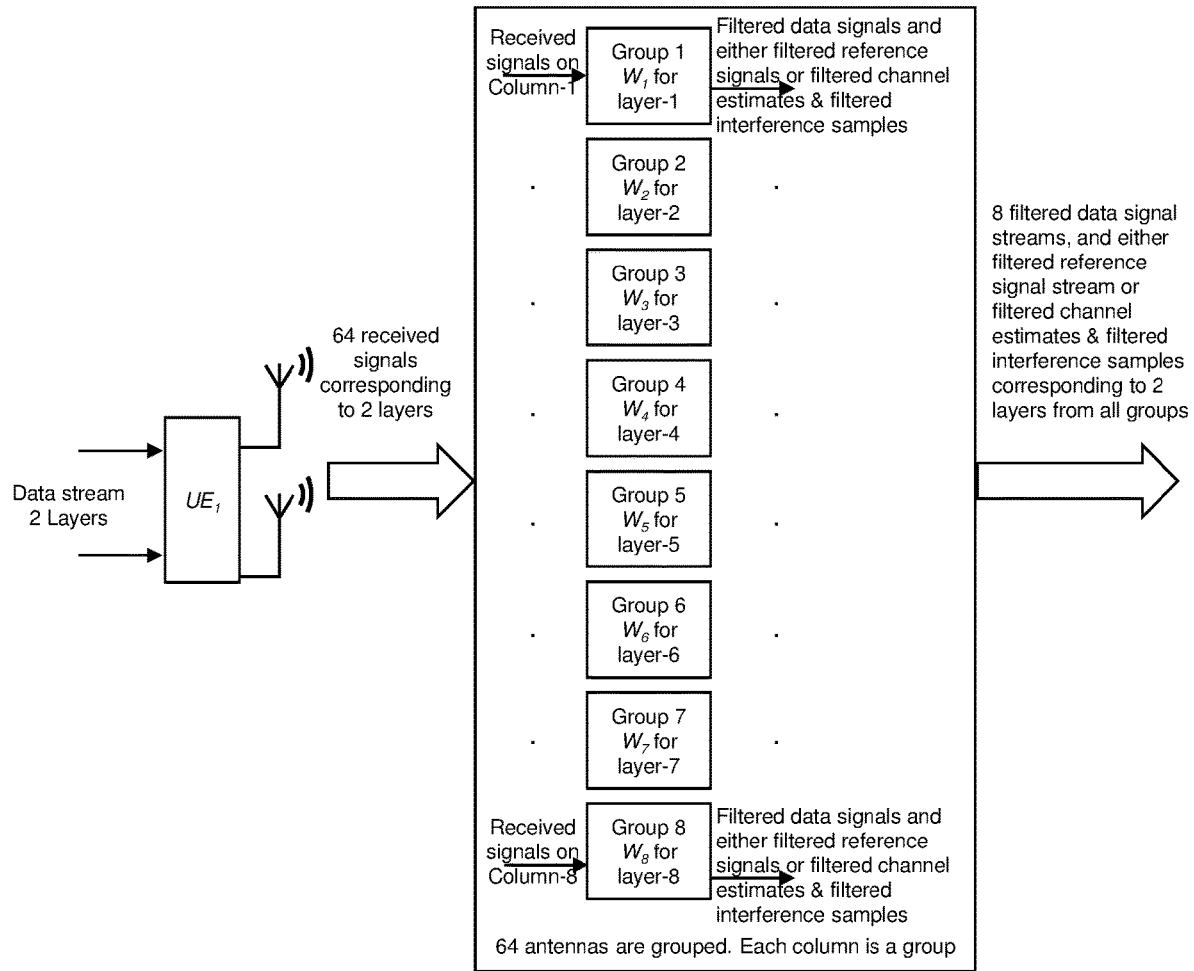
Figure 19:
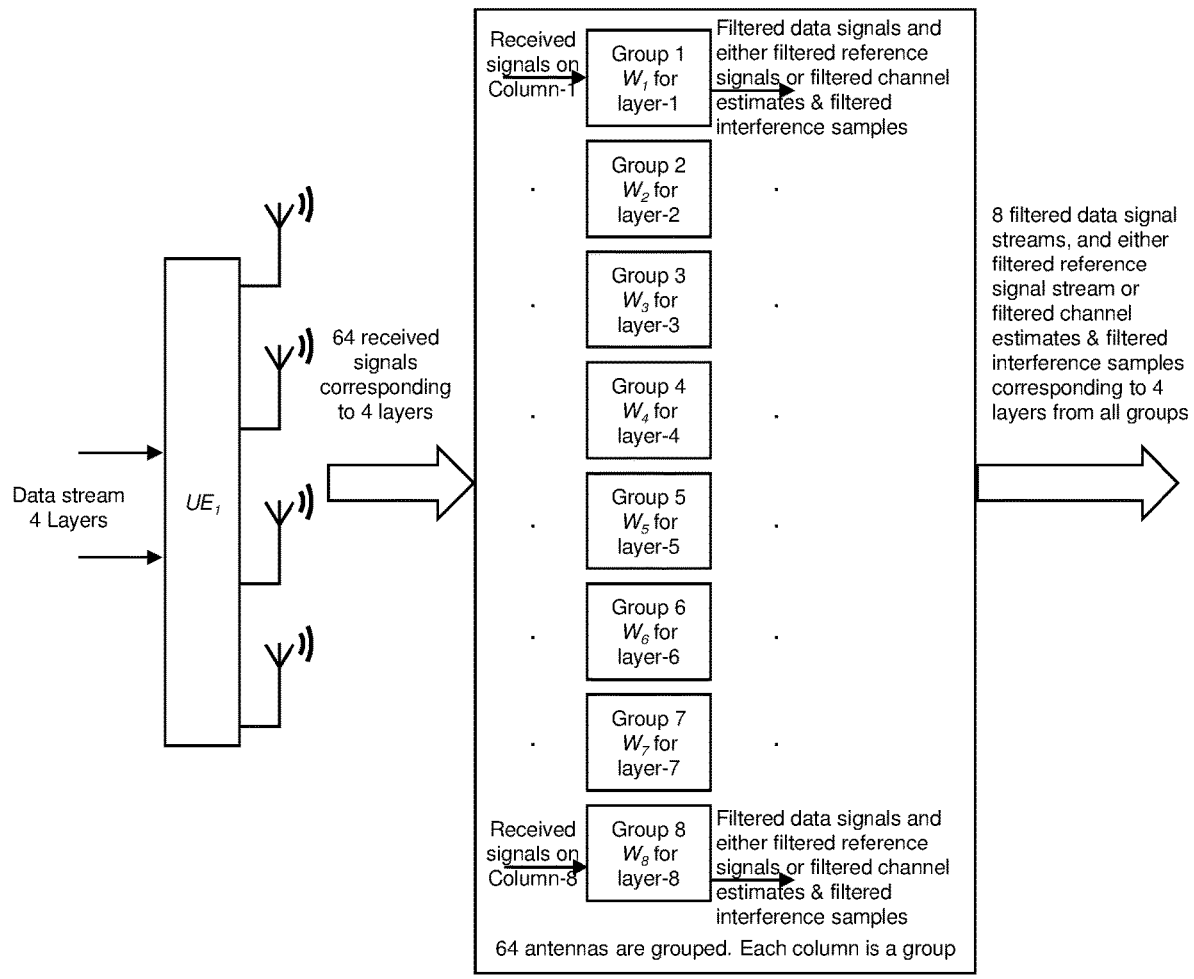
Figure 20:
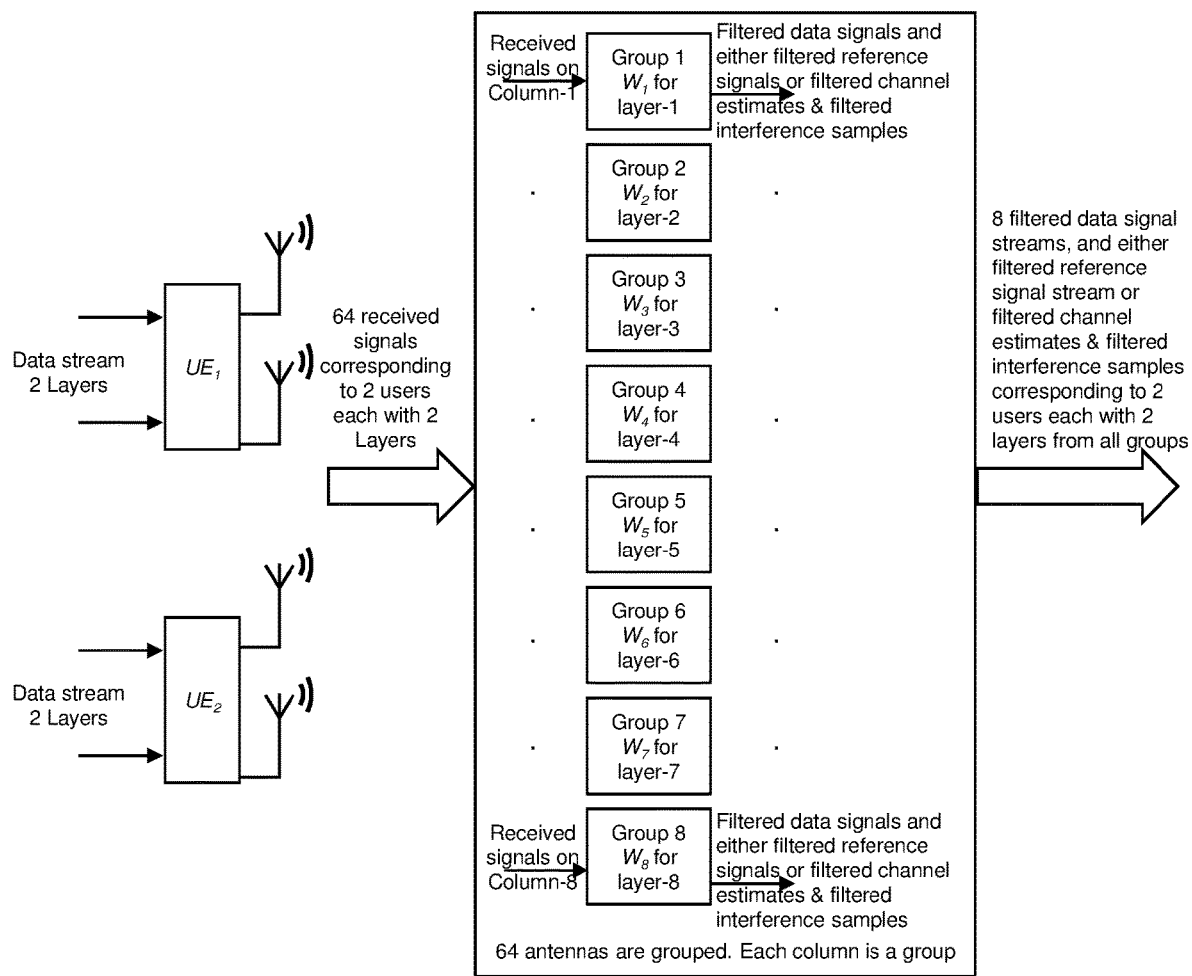
Figure 21:
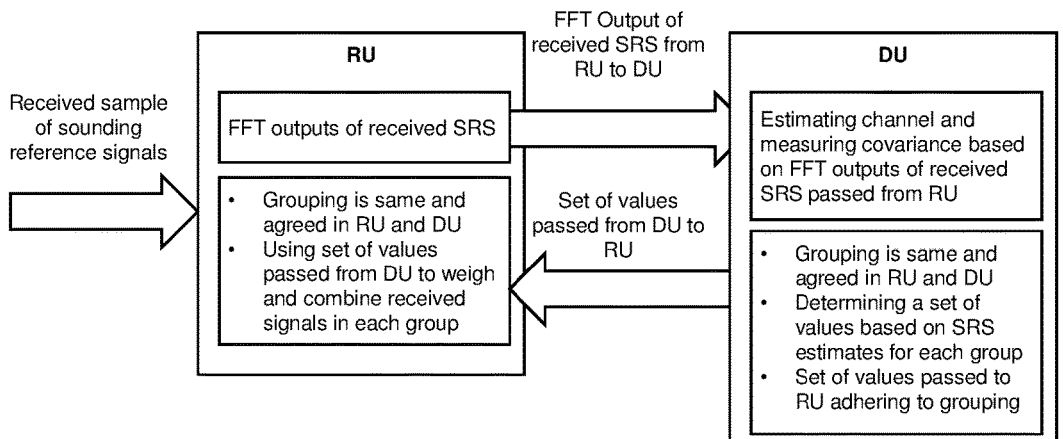
Figure 22:
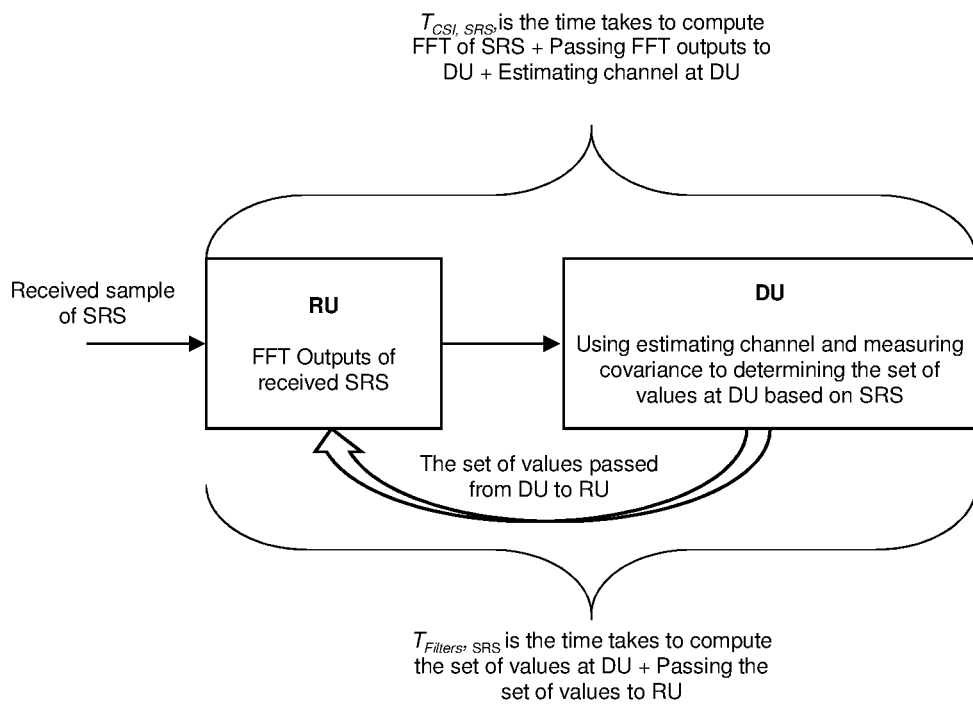
Figure 23:
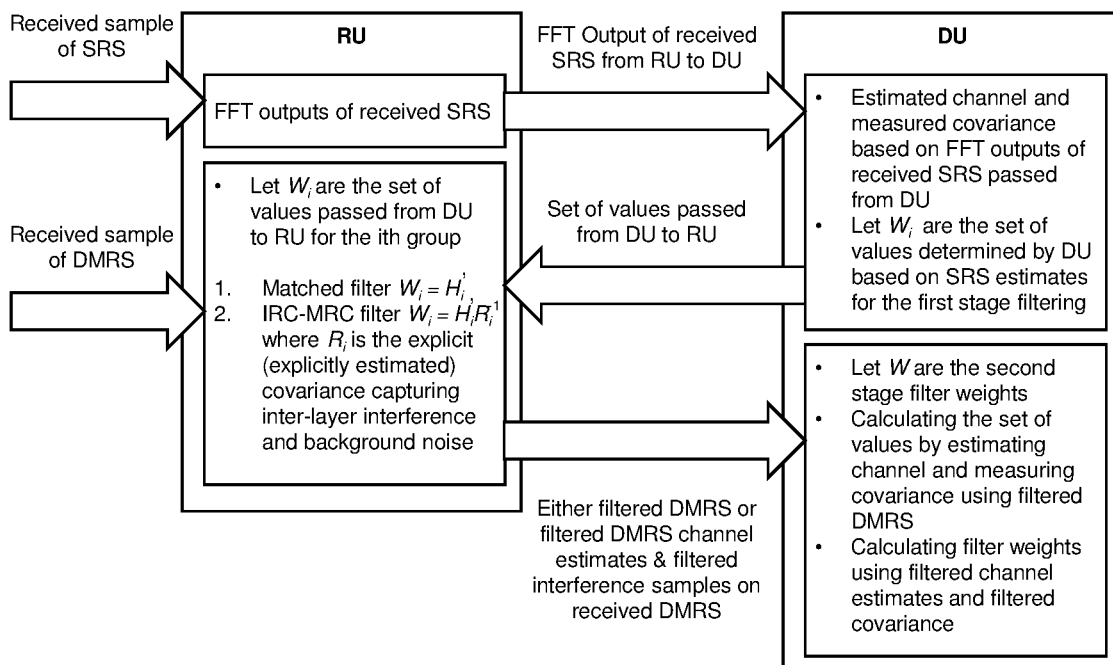
Figure 24:
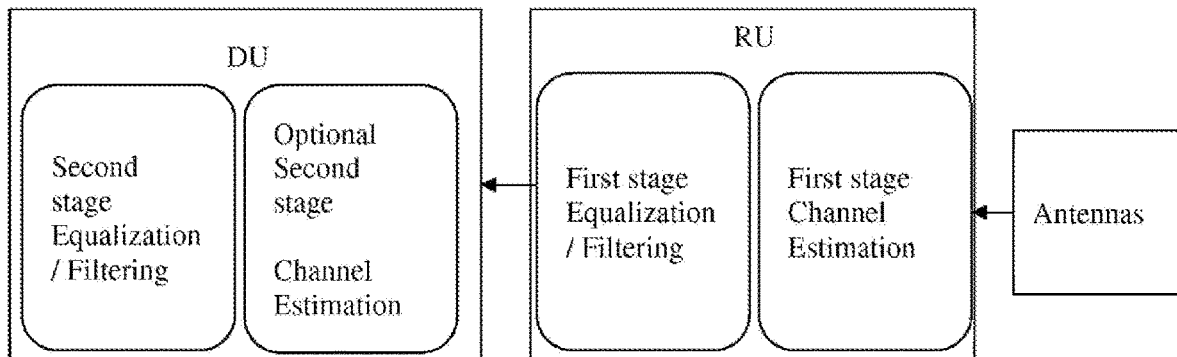
Figure 25:
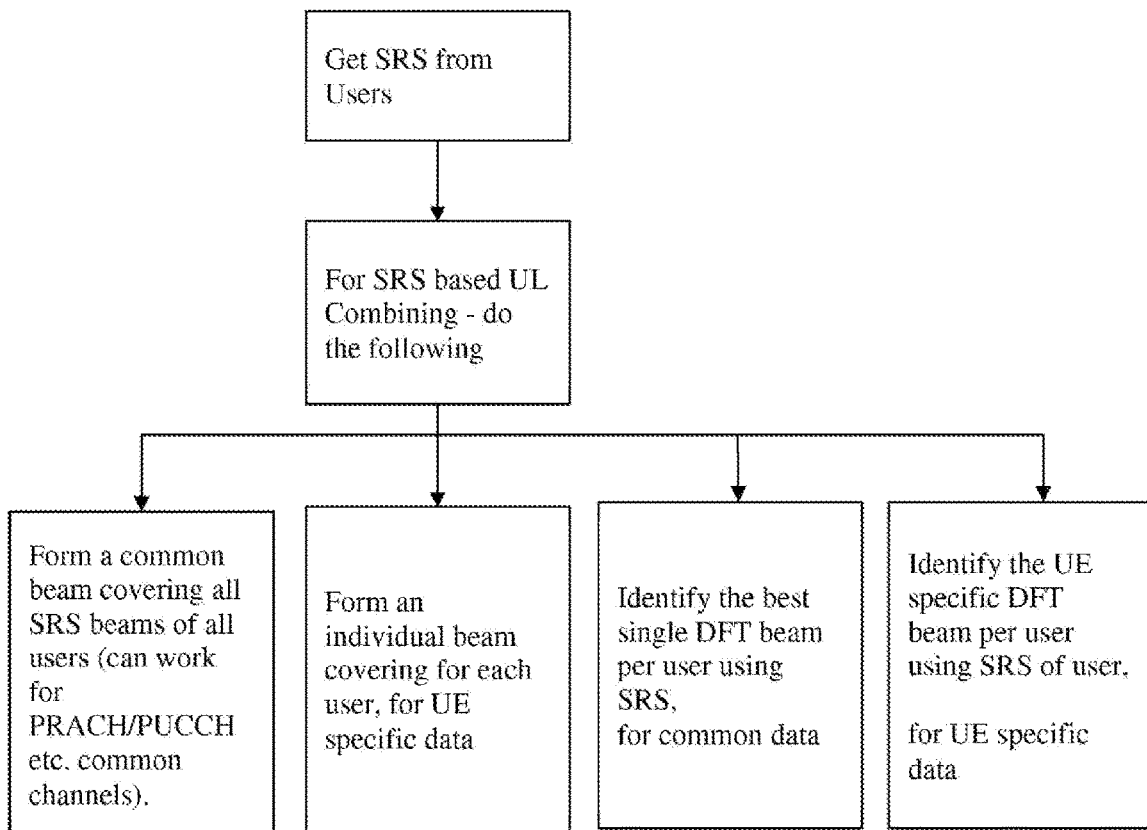
Figure 26:
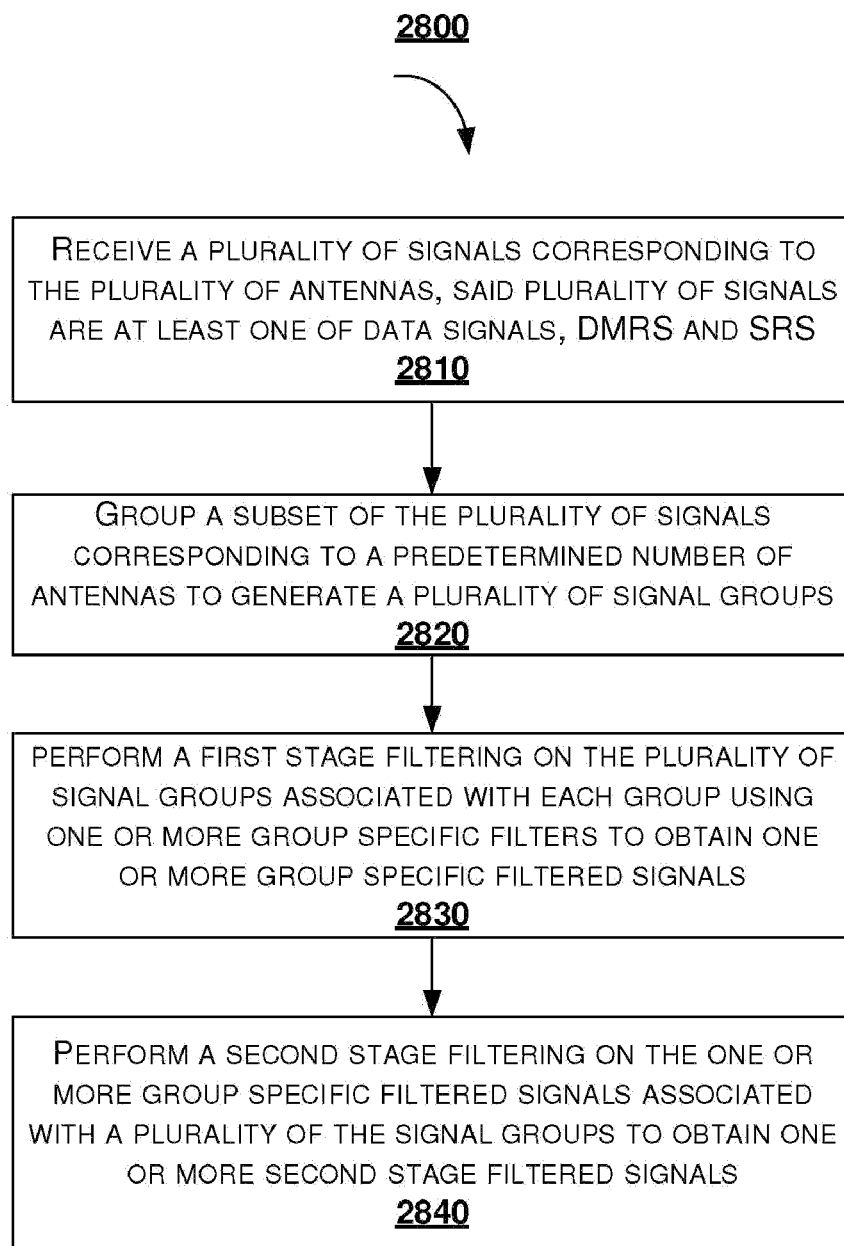

FIG. 10 a block diagram of a Massive MIMO base station (BS) in a communication network, in accordance with an embodiment of the present disclosure;

FIG. 11 shows an illustration of an Antenna Array Structure, in accordance with an embodiment of the present disclosure;

FIG. 12 shows a block diagram representation of performing condensing at the RU and the equalizing at the DU, in accordance with an embodiment of the present disclosure;

FIG. 13 shows a block diagram of RU-DU Split in two-stage filtering when group specific filtered DMRS are passed from RU to DU for estimating CSI and measuring interference plus noise covariance at DU and group specific filtered data is passed from RU to DU for equalization at DU, in accordance with an embodiment of the present disclosure;

FIG. 14 shows a block diagram of RU-DU Split in two-stage filtering when group specific filtered CSI and group specific filtered interference samples are passed from RU to DU for measuring interference plus noise covariance at DU and group specific filtered data is passed from RU to DU for equalization at DU, in accordance with another embodiment of the present disclosure;

FIG. 15A shows an illustration of first stage filtering at the RU when group specific filtered DMRS and group specific filtered data are outputs of RU, in accordance with an embodiment of the present disclosure;

FIG. 15B shows an illustration of first stage filtering at the RU when group specific filtered CSI, group specific filtered interference samples and filtered data are outputs of RU, in accordance with another embodiment of the present disclosure;

FIG. 16A shows a block diagram representation of an interference plus noise covariance estimation at the DU using group specific filtered DMRS, in accordance with an embodiment of the present disclosure;

FIG. 16B shows a block diagram representation of interference plus noise covariance estimation at the DU using group specific filtered interference samples, in accordance with an embodiment of the present disclosure;

FIG. 17 shows an illustration of two-stage filtering using DMRS based weights to perform first-stage filtering at RU and second-stage filtering at DU; in accordance with an embodiment of the present disclosure;

FIG. 18 shows an illustration of grouping in SU-MIMO with 2 layers, in accordance with an embodiment of the present disclosure;

FIG. 19 shows an illustration of grouping in SU-MIMO with 4 layers, in accordance with an embodiment of the present disclosure;

FIG. 20 shows an illustration of grouping in MU-MIMO with 2 users each with 2 layers, in accordance with an embodiment of the present disclosure;

FIG. 21 shows an illustration of two-stage filtering using SRS based weights at the RU to perform first-stage filtering;

FIG. 22 shows an illustration of delay introduced in the first-stage filtering when SRS based filter weights are used at the RU;

FIG. 23 shows an illustration of two-stage filtering using SRS based weights to perform first-stage filtering at the RU and DMRS based weights to perform second-stage filtering at DU;

FIG. 24 shows a block diagram illustration of filtering using a split of the DU and the RU, in accordance with an embodiment of the present disclosure;

FIG. 25 shows an illustration of a method using SRS from multiple users, in accordance with an embodiment of the present disclosure; and FIG. 26 shows a flowchart illustrating method of received signal processing by a massive multiple input multiple output (MIMO) base station (BS), in accordance with an alternative embodiments of the present disclosure.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Embodiments of the present disclosure provide split-8 and split 7.2× designs for a base station (BS). In single stage filtering traditional methods, the radio unit (RU) processes all the 64 antennas data together using some linear or non-linear methods such as Interference Rejection Combining (IRC), specific minimum mean square error (MMSE), Maximal Ratio Combining (MRC), matched filter (MF), and the like. The output of the RU will be the required number of actual data streams present in the incoming transmissions. The complexity of these methods depends on number of antennas of the BS. This may involve matrix inversions of the size 64*64 among other complex operations. These methods are most suitable for split-8 deployments. However, when this method is employed for the split 7.2× deployment, then the RU condenses to the required number of layers and the layers are sent to DU. The DU will only process them for Forward Error Correction (FEC).

Embodiments of the present disclosure also relate to a two stage filtering method at a BS for single layer (SU-MIMO) detection comprising a distributed unit (DU) and a radio unit (RU), which jointly process the data incoming. Since, the DU and the RU are independent units and Forward Error Correction (FEC) is generally only present in the DU. The words such as filtering or beamforming or condensing are used interchangeably. Here, receiver beamforming is done in two stages.

FIG. 10 a block diagram of a Massive MIMO base station (BS) in a communication network, in accordance with an embodiment of the present disclosure.

As shown in FIG. 10, the Massive MIMO BS 1000, is referred as a BS, comprises a processor 1002, and a memory 1004 coupled with the processor. The BS 1000 may also be referred as a receiver or a transceiver or a communication system. The processor may be configured to perform one or more functions of the BS 1000 for receiving input and processing the same. In one implementation, the BS 1000 may comprise blocks 1006, also referred to as modules or units, for performing various operations in accordance with the embodiments of the present disclosure.

The unit 1006 includes at least one radio unit (RU) 1008, at least one distributed unit (DU) 1010, an interface 1012, and a plurality of antennas (not shown in the figure). In an embodiment, the BS 1000 is configured to process received input signal 1020 and generate an output signal 1022. The received input signal is one of a signal stream, a plurality of signals, one or more signal streams and at least one signal.

The at least one of RU is referred as RU. The at least one of DU is referred as DU. The interface is a fronthaul interface. In an embodiment, the first stage filtering and the second stage filtering are performed in the RU and the DU respectively, wherein the RU and the DU are co-located.

The RU 1008 is configured to receive a plurality of signals corresponding to the plurality of antennas. The plurality of signals comprises at least one of data signals, demodulation reference signals (DMRS) and sounding reference signals (SRS). Thereafter, the RU 1008 performs grouping operation on a subset of the plurality of signals, corresponding to a subset of antennas of a group, to generate a plurality of signal groups. The plurality of signals associated with each group is at least one of the data signals, the DMRS and the SRS. In an embodiment, the signals associated with each of the plurality of signal groups comprises at least one user. The at least one user includes at least one layer.

In an embodiment, the grouping performed on the received signal streams such that each sub-group comprises signals corresponding to a distinct set of antennas. For example, the received signal streams associated with the antennas of any vertical column of a given polarization may belong to one group. With 64-antennas, there may have 8 groups with 8-antennas streams of a given column per group.

After the grouping operation, the RU 1008 performs a first stage filtering on the plurality of signal groups associated with each group using one or more group specific filters to obtain one or more group specific filtered signals. The first stage filtering is also referred as group specific filtering of the signals associated with a given group. The filter coefficients of a given group are obtained using at least one of estimated channel state information and estimated noise-plus-interference covariance associated with the received signals of the group. The first stage filtering or group specific filtering would result in one output per group per layer. The output comprises of group specific filtered data and group specific filtered reference signals The group specific filters are determined using at least one of the signals associated with the group, and a set of values communicated by the DU 1010 to the RU 1008. The set of values are determined by the DU 1010 based on SRS or predetermined values. The predetermined values are obtained using group specific Discrete Fourier Transform (DFT) weights. The group specific DFT weights include a group specific steering angle. In an embodiment, the predetermined values are obtained using one or more group specific weights that are selected from a code book. In an embodiment, the set of values determined by the DU 1010 based on the SRS, are associated with a subset of users and a subset of layers, wherein one or more group specific signals of a group are weighed and combined using the set of values to obtain one or more group specific filtered signals.

Each one of the one or more group specific filters of a group is associated with a subset of users and a subset of layers associated with a subset of users. The union of the subsets of users and the subsets of layers comprises the set of all the users and all the layers associated with the plurality of signals. Also, the one or more group specific filters of a group is associated with a single user and one of multiple layers of said single user. In an embodiment, the one or more group specific filters of a group is associated with one of multiple users, and one of multiple layers of the one of multiple users.

In an embodiment, each one of the one or more group specific filters associated with a user and a layer is obtained using one of a group specific, a user specific and a layer specific matched filter; a group specific, a user specific and a layer specific minimum mean square error (MMSE) filter; and a group specific, a user specific and a layer specific MMSE Interference Rejection Combining (IRC) filter.

In an embodiment, each one of the one or more group specific filters is a matched filter. The matched filter is associated with one user and one layer, wherein union of said user and said layer comprises a set of all the users and all the layers associated with the plurality of signals. The matched filter weights are determined using one of the SRS and the DMRS.

The one or more group specific filtered signals comprises one or more group specific filtered data signals, one or more group specific filtered DMRS, one or more group specific filtered CSI, and one or more group specific filtered interference plus noise signals.

In an embodiment, the DU 1010 also performs grouping operation on a subset of the plurality of signals, corresponding to a subset of antennas of a group, to generate a plurality of signal groups. The plurality of signals associated with each group is at least one of the data signals and the SRS. In an embodiment, the grouping operation performed in the RU and the DU is same.

The DU 1010 performs a second stage filtering on the one or more group specific filtered signals associated with a plurality of the signal groups, received from the RU 1008, to obtain one or more second stage filtered signals. In an embodiment, the DU 1010 receives baseband I/Q samples of the group specific signals are compressed using an I/Q compressor. The DU 1010 performs I/Q decompression and retrieval of I/Q samples of the group specific filtered signals. Also, the DU 1010 applies a detection method to process the group specific filtered signals. The detection methods may be one of linear and non-linear equalizers.

The second stage filtering is performed by one or more second stage filters, wherein each of the one or more second stage filters and each of the one or more second stage filtered signals are associated with a user and a layer. Each of the one or more second stage filters or each second stage filter is one of a second stage matched filter, a second stage MMSE filter, and a second stage MMSE-IRC filter.

Also, each of the one or more second stage filters are associated with at least one of an estimated second stage CSI associated and a measured second stage interference covariance. The estimated second stage CSI and the measured second stage interference covariance are obtained using the group specific filtered DMRS, in an embodiment. Also, the estimated second stage CSI is obtained from one or more group specific filtered CSI, the measured second stage interference covariance is obtained from one or more group specific filtered interference plus noise signals, in an embodiment.

FIG. 11 shows an illustration of an Antenna Array Structure, in accordance with an embodiment of the present disclosure.

In Antenna Array Structures, antenna array has a substantial role to play in receiver beamforming. An antenna array can be modelled as (M, N, P, K, L, dz, dy), where M is number antenna elements in vertical, N is number of antenna elements in horizontal, P is number of polarizations to support Co-Pol and X-Pol, K is number of antenna elements with same input feed in vertical, L is number of antenna elements with same input feed in horizontal, dz is spacing between antenna elements in vertical, dy is spacing between antenna elements in horizontal.

Total number of antenna elements are M×N×P. Mapping antenna elements to same input feed can be done in several ways.

As shown in FIG. 11, considering an example of 128 antenna elements with 64 antenna feeds. The antenna array can be represented as [8, 8, 2, 2, 1, 0.5λ, 0.5λ], that is, 8 antenna elements in vertical, 8 in horizontal each with cross polarization, and 128 antenna elements are used. In addition to that, 2 antenna elements are given the same feed in vertical and no mapping of multiple antenna elements to the same feed in horizontal. Eventually there are 64 antenna feeds with 128 antenna elements.

In an example embodiment, condensing is performed at the RU and equalizing is performed at the DU. This is performed by assuming 64 outputs from an antenna array with 8 elements in vertical and 4 elements in horizontal each with cross polarization. 8 outputs of each column of an antenna array is formed as a group. That is, 8 outputs corresponding to co-polarization are formed into one group and 8 outputs corresponding to cross polarization are formed into another group. In similar fashion, 8 groups are formed out of which 4 corresponds to co-polarization and another 4 corresponds to cross-polarization. That is, 8 stream output from the RU fed to the DU and the DU equalizes 8 streams and gives out one equalized data which will be further processed to decode data. The same can be extended to any antenna configuration M, N, P of the antenna array, and the size of the first group can be chosen from these.

FIG. 12 shows a block diagram representation of performing condensing at the RU and the equalizing at the DU, in accordance with an embodiment of the present disclosure.

As shown in FIG. 12, first stage filtering is performed in the RU and the second stage filtering is performed in the DU. First stage filtering at the RU helps in condensing or reducing the received signals on all antennas to a comparatively lesser number of streams and helps in reducing the computational complexity for equalizing the streams at the DU.

Also, the FIG. 12 assumes a single layer SU-MIMO. The first stage filtering is one of DFT weight combining, Matched Filter (MF), Maximal Ratio Combining (MRC), Minimum Mean Square Error (MMSE) equalization, Interference Rejection Combining (IRC), and Minimum Mean Square Error-Interference Rejection Combining (MMSE-IRC), etc. The DFT weight combining is a method that does not require knowledge of Channel State Information (CSI) and noise and interference covariance matrix (NICM) associated with the group signal. In this method, same weights are applied on all columns of an antenna array with specified or pre-determined elevation angle. For the remaining methods, filter coefficients are generated based on one of the estimated channel state information and measured covariance matrix associated with the group specific signals.

For example, as shown in FIG. 12 grouping is performed by assuming 64 antenna outputs and 8 outputs of each column is considered as a group. So, there are 8 groups in total. The grouping means the antenna elements in the group will be processed together. As shown in the FIG. 12, first stage filtering at the RU provides one stream output per group and said streams are passed to the DU for equalization. For single layer SU-MIMO, equalization at the DU provides one equalized output.

FIG. 13 shows a block diagram of RU-DU split in two-stage filtering when group specific filtered DMRS are passed from RU to DU for CSI and interference plus noise covariance estimation at DU and group specific filtered data is passed from RU to DU for equalization at DU, in accordance with an embodiment of the present disclosure.

As shown in the FIG. 13, the RU performs first stage group specific filtering based on CSI and NICM. The DU performs a second stage filtering on the group specific filtered data using group specific filtered DMRS.

The first stage group specific filtering at RU is performed as follows:

Let Y is the received signal on all the antennas which will be of the form Y=HX+I+N is of the size 1×MNP where, H is the channel of size MNP×1 assuming one layer transmission from the user X is one of data and reference signals of size 1×1, I is the inter-cell interference of size MNP×1, and N is the background noise is of size MNP×1

All the variables are shown for a given sub-carrier in a given OFDM symbol. Considering one column of an antenna array, Let $Y_i=[Y_{i1}\ Y_{i2}\ \ldots\ Y_{iM}]^T$ is the received vector on $i^{th}$ column of an antenna array that comprises of the signals that belong to that column, $H_i=[H_{i1}\ H_{i2}\ \ldots\ H_{iM}]^T$ is the corresponding estimated channel of size M×1, $N_0$ is the measured variance of interference+noise on a column i; and $R_i=(Y_i-H_iX)(Y_i-H_iX)'$ is the measured covariance of interference+noise on a column i of size M×M Filter coefficients for some of the methods except DFT combining are calculated as follows:

First stage MF filter coefficients $W_i=H_i'$

First stage MRC filter coefficients $W_i=H_i'(diag(Ri))^{-1}$

First stage MMSE filter coefficients $W_i=(H_i'H_i+N_0I)^{-1}H_i'$

First stage IRC-MRC filter coefficients $W_i=H_i'R_i^{-1}$

First stage IRC-MMSE filter coefficients $W_i=(H_i'R_i^{-1}H_i+I)^{-1}H_i'R_i^{-1}$ $W_i=[W_{i1}\ W_{i2}\ \ldots\ W_{iM}]$ are the first stage filter coefficients corresponds to column i of an antenna array and is of size 1×M. Here $H_i'$ is the conjugate transpose of $H_i$ and ' is used to represent conjugate transpose from now on.

The DU receives the group specific filtered data $Z_i$ and group specific filtered DMRS from the RU. The DU estimates CSI and measures NICM from the group specific filtered DMRS. The DU generates the filter coefficients using the estimated CSI and the measured NICM. The filtered coefficients are applied on the received group specific filtered data to perform a second stage filtering and generate equalized data.

FIG. 14 shows a block diagram of RU-DU split in two-stage filtering when group specific filtered CSI, group specific filtered interference samples are passed from RU to DU to measure interference plus noise covariance and group specific filtered data is passed from RU to DU for equalization at DU, in accordance with an embodiment of the present disclosure.

As shown in FIG. 14, the RU generates group specific filtered CSI and group specific filtered interference samples from the received signal. Also, the RU estimates CSI and measure NICM. The RU transmits group specific filtered specific CSI, group specific filtered interference samples and the group specific filtered data to the DU. The DU measures the NICM using the filtered interference samples. The DU generates the filter coefficients using the filtered CSI and the measured NICM. The filtered coefficients are applied on the received group specific filtered data to perform a second stage filtering and generate equalized data.

FIG. 15A shows an illustration of first stage filtering at the RU when group specific filtered DMRS and group specific filtered data are outputs of RU, in accordance with an embodiment of the present disclosure.

The first stage filtering at the RU comprises grouping of received signals, generating and applying filter coefficients specific to a group. A group here refers to a group of antenna elements in the antenna array. The grouping can be done in many ways, such as, but not limited to:

- All vertical elements are grouped together.
- All polarization elements are grouped together.
- A number is indicated by the DU to the RU for grouping purposes and then, the RU groups those antenna elements, as an example the grouping may be one of 8, 16 and 32.
- The RU indicates its capability first to DU and then the DU may inform the RU accordingly about the grouping factor to be used. The grouping factor or dimensions i.e., horizontal or vertical or any other dimension can be signaled as well by the DU. In an embodiment, the grouping is independently performed by the RU without the involvement of the DU.
- The total streams from the RU to the DU are number of Elements/number of groups. This limitation may be indicated from the DU to the RU and the RU may decide by itself the grouping phenomenon.

For example, grouping is performed by assuming 64 antenna outputs and 8 outputs of each column is considered as a group. So, there are 8 groups in total. The grouping means the antenna elements in the group will be processed together. The number of antenna elements to group determines the interference cancellation using the filters and how the filter may be designed. The filter is designed based on the information relevant to the group such as channel state information of the grouped signals, signals received on the group such as data signals, reference signals, null tones received on the antennas of the group i.e. null tones are tones without any data or reference signal transmission, which can be used for noise and interference estimation. The reference signals can be at least one of SRS, DMRS and the like. The data signals correspond to one of PRACH, PUCCH, PUSCH data and the like.

In an embodiment, assuming a group size of 8 as an example, grouping is performed in such a way that each column in an antenna array is a group. The rationale for considering the antenna elements of a given polarization of a vertical column into one group is as follows: The channel state associated with the signals that infringe on the vertical elements of a vertical column tend to be highly correlated. The relation between the channel states of these signals depend mainly on the antennas spacing, DOA of the signal of interest and the DOA of any co-channel interference signal. The aim of the two-stage receiver in such a scenario is as follows:

The first stage filtering applies a group/column specific filter on each column to obtain a group/column specific output that is a single output. That is the group/column specific filter weights and combines the signal that belong to a specific group/column to obtain a single output. The weights are selected with an aim to maximize the signal quality or reduce interference etc.

The filtering is applied to both the data and DMRS that belong to each group/column. After obtaining the group/column specific filter to all the available groups/columns present, there are a number of outputs equal to L (e.g., L=8).

FIG. 15B shows an illustration of first stage filtering at the RU when group specific filtered CSI, group specific filtered interference samples, and group specific filtered data are outputs of RU, in accordance with an embodiment of the present disclosure.

The second stage filtering is performed at the DU on the filtered data received from the RU. DU uses at least one of group specific filtered DMRS, group specific filtered CSI, and group specific filtered interference samples passed from RU to estimate CSI and NICM and use them are used for generating second-stage filter coefficients. The second stage filter is configured to combine the RU outputs in such way that the signal energy is maximized and residual noise-plus-interference that is left after RU filtering is minimized. Typical filtering solutions are one of MF, MRC, MMSE equalization, IRC followed by MRC, and IRC followed by MMSE. The second stage filter equalizes the filtered data signals passed from RU and this equalized data is further processed to decode the data. Following explanation assumes group specific filtered CSI and group specific filtered interference samples are passed from RU to DU Filter coefficients at the DU 1110 are generated similar to how it is done at RU. Let G of size 1×NP, is filtered CSI, that is $G=[\hat{H}_1 \ \hat{H}_2 \ \ldots \ \hat{H}_{NP}]^T$, where $\hat{H}_i = W_{i1}H_{i1} + W_{i2}H_{i2} + \ldots + W_{iM}H_{iM}$, is the group specific filtered CSI of group i and $\hat{R}_I$ of size NP×NP, is the measured covariance using group specific filtered interference samples, that takes an explicit form for example $\hat{R}_I = \hat{I}\hat{I}'$, $\hat{I} = [I_1 \ I_2 \ \ldots \ I_{NP}]^T$ and $I_i$ will be of the form $W_i(Y_i - H_i X)$ Filter coefficients are calculated as follows, Second stage MF filter coefficients $\hat{W} = G'$ Second stage MRC filter coefficients $\hat{W} = G'(diag(\hat{R}_I))^{-1}$ Second stage MMSE filter coefficients $\hat{W} = (G'G + trace(\hat{R}_I)/size(\hat{R}_I)I)^{-1}G'$ Second stage IRC-MRC filter coefficients $\hat{W} = G'\hat{R}_I^{-1}$ Second stage IRC-MMSE filter coefficients $\hat{W} = (G'\hat{R}_I^{-1}G+I)^{-1}G'\hat{R}_I^{-1}$ $\hat{W}$ are the second stage filter coefficients and these filter coefficients are applied on filtered data signal to equalize the data $$\hat{Z} = \hat{W} \times Z$$

The post processing SINR on each subcarrier is equal to $G'\hat{R}_I^{-1}G$. Z is suitably scaled before LLRs are passed to the decoder. Equalized data is further processed to decode the data.

In an embodiment, there are three methods to estimate interference plus noise covariance at the DU. First method is using group specific filtered interference samples passed from the RU to the DU, the second method is using group specific filtered DMRS passed from the RU to the DU, and the third method is using group specific filtered CSI and group specific filtered DMRS passed from RU to DU.

In the first method, group specific filtered samples $I_i$ of a group i are passed from RU to DU. Similarly, group specific filtered interference samples are passed from RU to DU from all the groups. These group specific filtered interference samples from all groups are accumulated at DU and used to measure interference plus noise covariance as follows $$\hat{I}=[I_1\ I_2\ \ldots\ I_{NP}]^T \text{ where}$$

$I_i = W_i(Y_i - H_i X)$ are the group specific filtered interference samples of group i passed from RU to DU Interference plus noise covariance is $\hat{I}\hat{I}'$ In the second method, group specific filtered DMRS are passed from RU to DU. Similarly, group specific filtered DMRS are passed from RU to DU from all the groups. These group specific filtered DMRS from all groups are accumulated at DU and used to estimate CSI and measure interference plus noise covariance as follows $$I = \hat{Y} - \hat{H}X,$$

$\hat{Y} = [\hat{Y}_1\ \hat{Y}_2\ \ldots\ \hat{Y}_{NP}]^T$ is the accumulated filtered DMRS passed from RU to DU $\hat{H}$ is the estimated CSI at DU Interference plus noise covariance is $\hat{I}\hat{I}'$ In the third method, group specific filtered CSI and group specific filtered DMRS are passed from RU to DU. Similarly, group specific filtered CSI and group specific filtered DMRS are passed from RU to DU from all the groups. These group specific filtered CSI and group specific filtered DMRS from all groups are accumulated at DU and used to measure interference plus noise covariance as follows $$I = \hat{Y} - \hat{H}X,$$

$\hat{Y} = [\hat{Y}_1\ \hat{Y}_2\ \ldots\ \hat{Y}_{NP}]^T$ is the accumulated filtered DMRS passed from RU to DU $\hat{H}$ is the filtered estimated CSI passed from RU to DU Interference plus noise covariance is $\hat{I}\hat{I}'$ FIG. 16A shows a block diagram representation of an interference plus noise covariance estimation at the DU using group specific filtered DMRS, in accordance with an embodiment of the present disclosure.

FIG. 16B shows a block diagram representation of an interference plus noise covariance estimation at the DU using group specific filtered interference samples, in accordance with an embodiment of the present disclosure.

One embodiment of the present disclosure is estimation of CSI and interference plus noise covariance $R_i$ for a group. A group specific signals consist of data and one or more DMRS. The operations w.r.t channel estimation and estimation of $R_i$ for a given group are as follows:

- Estimate and correct the timing and frequency offsets on one or more DMRS symbols that are present in the group
- Obtained estimated CSI after interpolation in time and frequency
- Collect noise-plus-interference samples by subtracting the regenerated reference signal that is obtained based on estimated CSI and the reference symbol sequence. Obtain an estimate of the group specific $R_i$ by averaging the per subcarrier $R_i$ estimates over all the available subcarriers in a PRB or PRG of a time slot (i.e., the minimum allocated resource over which both data and reference symbols experience same interference signals) of all available DMRS symbols.
- Obtain the group specific filter coefficients based on the estimated CSI and estimated $R_i$
- Filter the data and RS of the group using the group specific filter The filter coefficients are applied on received signal on each column from i=1 to NP as shown below:

$$Z_i = W_i \times Y_i$$

$$Z_i = W_{i1}Y_{i1} + W_{i2}Y_{i2} + \ldots + W_{iM}Y_{iM}$$

Similarly, the group specific filter coefficients are applied on each column and filtered data signal output will be of the form $Z = [Z_1\ Z_2\ \ldots\ Z_{NP}]^T$ is of size 1×NP. Similar operation is carried out on the RS as well. The filtered data and RS associated with all the groups are communicated to the DU through I/Q compression at DU, transmission as per ORAN specification over a wired medium and collection at the DU, processing that includes I/Q decompression followed by DU filtering for the specific physical channel of interest.

FIG. 17 shows an illustration of two-stage filtering using DMRS based weights to perform first-stage filtering at RU and second-stage filtering at DU, in accordance with an embodiment of the present disclosure.

As shown in FIG. 17, the two-stage filtering is performed using DMRS based weights at RU to perform first-stage filtering and DMRS based weights at DU to perform second-stage filtering. The RU estimates channel and measures covariance using FFT outputs of received DMRS. Then, the RU determines filter weights to perform first-stage filtering. After first-stage filtering at the RU, the DU uses at least one of group specific filtered DMRS, group specific filtered CSI, and group specific filtered interference samples passed from RU to DU to determine filter coefficients for second-stage filtering.

One embodiment of the present disclosure are filtering methods for Multilayer transmission of Single User-Multiple Input Multiple Output (SU-MIMO) and Multiple Users-Multiple Input Multiple Output (MU-MIMO). When multiplexing is introduced such as SU-MIMO with more than one-layer transmission, or in MU-MIMO where multiple users are multiplexed on same time frequency resources, filtering needs to consider user and layer specific filtering as well. That is, in first stage filtering, group specific filtering needs to take into account the number of layers transmitted in uplink and second stage filtering needs to equalize data signals from all the layers.

One embodiment of the present disclosure is SU-MIMO filtering. Considering a 2-layer transmission and filtering technique:

$$Y_i = H_i X + N_i$$

where $$H_i X = H_{1i} X_1 + H_{2i} X_2$$

where, i=1 to NP for all columns (where column includes polarization as well)

$Y_i$ is the received signal on a column i of size M×1, and $H_i$ is the estimated channel for both layers on a column i of size M×2

In SU-MIMO with more than one-layer transmission, the first stage filtering can be performed using two methods. The first method is a Multi-layer filtering method-1. In the first method, filter coefficients are generated specific to the detection of each layer in a group and inter-layer interference is accounted for in the covariance estimation associated with that layer. That is, for two layers, two set of filter coefficients are generated as follows:

$$W_{1i} = H_{1i}' R_{1i}^{-1}$$

where, $W_{1i}$ are the first stage filter coefficients corresponding to layer-1 to apply on column i of an antenna array.

$H_{1i}$ is the channel corresponding to layer-1 on a column i.

$R_{1i}$ is the measured interference plus noise covariance matrix corresponding to layer-1 on a column i, that is $R_{1i} = H_{2i}H_{1i} + R_{nn}$ and $R_{nn}$ is the measured covariance of inter-cell interference and noise.

Similarly, for layer-2

$$W_{2i} = H_{2i}'R_{2i}^{-1}$$

where, $W_{2i}$ are the first stage filter coefficients corresponding to layer-2 to apply on column i of an antenna array.

$H_{2i}$ is the channel corresponding to layer-2 on a column i of an antenna array.

$R_{2i}$ is the measured interference plus noise covariance matrix corresponding to layer-2, that is $R_{2i} = H_{1i}H_{1i}' + R_{nn}$.

After applying filter weights, $$Z_{1i} = W_{1i} \times Y_i$$

$$Z_{2i} = W_{2i} \times Y_i$$

$$Z_{1i} = H_{1i}'R_{1i}^{-1}H_{1i}X_1 + H_{1i}'R_{1i}^{-1}H_{2i}X_2 + H_{1i}'R_{1i}^{-1}N_i = G_{1,1,i}X_1 + G_{1,2,i}X_2 + N_{1i}$$

$$Z_{2i} = H_{2i}'R_{2i}^{-1}H_{1i}X_1 + H_{2i}'R_{2i}^{-1}H_{2i}X_2 + H_{2i}'R_{2i}^{-1}N_i = G_{2,1,i}X_1 + G_{2,2,i}X_2 + N_{2i}$$

where, $Z_{1i}$ is the filtered data corresponding to layer-1 on column i, and $Z_{2i}$ is the filtered data corresponding to layer-2 on column i.

The above procedure is repeated for all columns;

At the end, first stage filtering gives filtered channel estimates $G_{1,1} = [G_{1,1,1} \; G_{1,1,2} \; \ldots \; G_{1,1,NP}]^T$, $G_{1,2} = [G_{1,2,1} \; G_{1,2,2} \; \ldots \; G_{1,2,NP}]^T$, and filtered data $Z_1 = [Z_{1,1} \; Z_{1,2} \; \ldots \; Z_{1,NP}]^T$ for layer-1, filtered channel estimates $G_{2,1} = [G_{2,1,1} \; G_{2,1,2} \; \ldots \; G_{2,1,NP}]^T$, $G_{2,2} = [G_{2,2,1} \; G_{2,2,2} \; \ldots \; G_{2,2,NP}]^T$, and filtered data $Z_2 = [Z_{21} \; Z_{22} \; \ldots \; Z_{2NP}]^T$ for layer-2 as outputs. The first stage not only passes the group specific filtered data signals but also applies the aforementioned operations on the reference signals and communicates at least one of the group specific filtered DMRS, group specific filtered CSI, and group specific filtered interference samples to the second stage.

The above filtering is performed by considering that:

For each group, the operations such as time-frequency correction and channel interpolation are carried out for each layer and the compensation of time and frequency errors are carried out before proceeding with group specific filtering.

Further, a layer specific channel estimation is carried out on the DMRS of each layer and also the background NICM is estimated based on the DMRS of both layers.

In the case of a single layer, the group specific filter applies on the DMRS and the filtered DMRS is passed to the second stage. However, for the two-layer scenario, there are 4-filters applied on the DMRS associated with the two layers. Specifically, the channel state information associated with $Z_{1i}$ i.e., the filtered data corresponding to layer-1 on column i, and $Z_{1,2,i}$ i.e, the filtered data corresponding to layer-2 on column i are as follows: $G_{1,1,i}P_1$, $G_{1,2,i}P_2$, $G_{2,1,i}P_1$, $G_{2,2,i}P_2$ where $P_1$ is the received RS associated with the first layer and $P_2$ is the received RS associated with the second layer. So it can be observed that with 2-layer SU-MIMO, filtered CSI of size 2×2 is obtained from each group opposed to 1 filtered CSI in single layer SU-MIMO. That is, number of filtered CSI increases with order $O(n^n)$, where n is the number of layers. In case of 5G NR, for 2-layers, the DMRS are frequency multiplexed into even and odd subcarrier locations. Therefore, the RS of even subcarriers are filtered as: $G_{1,1,i}P_1$, $G_{2,1,i}P_1$ and RS of odd subcarriers are filtered as $G_{1,2,i}P_2$, $G_{2,2,i}P_2$ respectively.

This method generalizes to a 4-layers scenario where one first collects the DMRS of individual 4-layers followed by group specific processing steps.

As for DMRSs communicated to the DU is concerned, the number of reference signals are double the size compared to single layer scenario. This calls for a modification to the ORAN specifications to support such specialized RU group specific filtering.

In second stage filtering, filter coefficients to equalize the data signals of layer-1 are generated as follows $$\hat{W}_1 = G_{1,1}'\hat{R}_{1I}^{-1}$$

where $$\hat{R}_{1I} = \hat{I}_1\hat{I}_1' + G_{1,2}G_{1,2}'$$

Where $\hat{I}_1 = [I_{11} \; I_{12} \; \ldots \; I_{1NP}]^T$ and $I_{1i}$ will be of the form $W_{1i}(Y_i - H_{1i}X_1 - H_{2i}X_2)$ Similarly, for layer-2, filter coefficients are generated as follows:

$$\hat{W}_2 = G_{2,2}'\hat{R}_{2I}^{-1}$$

where $$\hat{R}_{2I} = \hat{I}_2\hat{I}_2' + G_{2,1}G_{2,1}'$$

Where $\hat{I}_2 = [I_{21} \; I_{22} \; \ldots \; I_{2NP}]^T$ and $I_{2i}$ will be of the form $W_{2i}(Y_i - H_{1i}X_1 - H_{2i}X_2)$ Equalized data on layer-1 $\hat{Z}_1 = \hat{W}_1 \times Z_1$ and on layer-2 $\hat{Z}_2 = \hat{W}_2 \times Z_2$. Equalized data is further processed to decode the data. Note that the DU utilizes at least one of the group specific filtered DMRS signals, group specific filtered CSI, and group specific filtered interference samples transmitted by the RU (or the first stage) for estimation of DU perceived CSI and residual NICM.

In Multi-layer filtering method-2, a sub-optimal alternative that uses with one filter/group for all layers. In this method, grouping of all column antennas of a given polarization is considered first. There are 4 columns for co-pol denoted as: [a, b, c, d] and another 4 for cross-pol denoted as: [e, f, g, h] (this can be generalized to other antenna panel configurations as well). The group specific filer for group {a} will be one that matches to the first layer and strives to eliminate interference caused by the second layer:

$$W_{11} = H_{11}'R_{11}^{-1}$$

For group {b}, a filter is applied that matches to the second layer and strives to eliminate interference caused by the first layer:

$$W_{22} = H_{22}'R_{22}^{-1}$$

Likewise, {c} uses a filter matched to the first layer and {d} uses one that is matched to the second layer. The same approach is followed for the cross-pol groups where a matched filter matched with any one layer is applied, but alternates between adjacent columns. This approach has the benefit that, it can retain compliance to ORAN since the number of filtered signals per group does not increase with the number of layers. There will be some performance penalty but it is expected to be reasonably small for SU MIMO, since the channel vectors associated with the layers generally tend to linearly dependent and separation of self-interference between the layers using column specific filtering of a given polarization is not an effective strategy in the first place.

Also, the method generalizes to 4-layers as well. In that case, 4-different matched filters each matched to one of the 4-layers are applied on the groups [a, b, c, d]. Likewise, applying the same strategy on the groups [e, f, g, h].

For 1-layer case, filter either even or odd DMRS depending on the DMRS port assigned to the layer For >1-layer case, apply the same filter to even and odd DMRS, and send these filtered DMRS as if they are the original DMRS IQ samples to the DU.

FIG. 18 shows an illustration of grouping in SU-MIMO with 2 layers aligned with Multi-layer filtering method-2 in accordance with an embodiment of the present disclosure. As shown in FIG. 18, considering 8×4×2 antenna array that is 64 receive antennas system. Each column with 8 vertical elements is a group and in total there are 8 groups, 4 corresponding to co-polarization and another 4 corresponding to cross-polarization. Figure below explains about grouping of SU-MIMO with 2 layers. The 2 layers are alternatively assigned to 8 groups. For example, consider the groups as {a, b, c, d, e, f, g, h}, such that the groups {a, c, e, g} are assigned to layer-1 and {b, d, f, h} are assigned to layer-2.

FIG. 19 shows an illustration of grouping in SU-MIMO with 4 layers aligned with Multi-layer filtering method-2, in accordance with an embodiment of the present disclosure. As shown in FIG. 19, considering 8×4×2 antenna array that is 64 receive antennas. Each column with 8 vertical elements is a group and in total there are 8 groups, 4 corresponding to co-polarization and another 4 corresponding to cross-polarization. As shown in FIG. 19, the grouping of SU-MIMO with 4 layers is performed i.e. 4 layers are alternatively assigned to 8 groups. For example, consider 8 groups as {a, b, c, d, e, f, g, h}, {a, e} groups are assigned to layer-1, groups {b, f} are assigned to layer-2, groups {c, g} are assigned to layer-3, and {d, h} are assigned to layer-4

For Multi-user MIMO, where multiple users are multiplexed on same time frequency resources. So, MU-MIMO more often handles more than 2 layers. So two-stage filtering of MU-MIMO can be seen as an extension of SU-MIMO with two-layer transmission explained in Multi-layer filtering method-1. Two-stage filtering explained below assumes IRC followed by MRC at both RU and DU.

Let L is the number of layers that are multiplexed for MU-MIMO, two-stage filtering should mitigate the inter-layer interference from L-1 layers along with inter-cell interference and background noise. Let $Y_j$ is the received vector on a column i and it will be of the form:

$$Y_i = \sum_{j=1}^{L} H_{j,i} X_j + I_i + N_i$$

where,
i is from 1 to NP
$H_{j,i}$ is the estimated channel corresponds to $j^{th}$ layer on column i
$X_j$ is the data corresponds to layer j
$I_i + N_i$ is the inter-cell interference and background noise on column i
Filter coefficients corresponds to layer j are calculated as follows $$W_{ji} = H_{ji}' R_{ji}^{-1}$$

where $R_{ji} = \sum_{k=1, k \neq j}^{L} H_{ki} H_{ki}' + R_{nn}$ and $R_{nn}$ is the covariance of inter-cell interference and background noise. Similarly, filter coefficients are generated for all layers. After applying weights, filtered data signal of layer j will be of the form:

$$Z_{ji} = W_{ji} \times Y_i$$

and this repeats for all the layers and finally first stage filtering gives filtered data signals as outputs.

At the end, first stage filtering gives filtered channel estimates $G_{j,j} = [G_{j,j,1} \ G_{j,j,2} \ldots G_{j,j,NP}]^T G_{j,k} = [G_{j,k,1} \ G_{j,k,2} \ldots G_{j,k,NP}]^T$ for k=1 to L and k≠j, and filtered data signals $Z_j = [Z_{j1} \ Z_{j2} \ldots Z_{jNP}]^T$ for layer-j as outputs. Similarly, first stage filtering produces outputs for all layers on each group.

Second stage filtering uses filtered CSI and filtered covariance matrix from first stage and generates filter coefficients as follows:

$$\hat{W}_j = G_{j,j}' \hat{R}_j^{-1}$$

where $$\hat{R}_j = \hat{I}_j \hat{I}_j' + \sum_{k=1, k \neq j}^{L} G_{j,k} G_{j,k}'$$

Where $\hat{I}_j = [I_{j1} \ I_{j2} \ldots I_{jNP}]^T$ and $I_{ji}$ will be of the form $W_{ji}(Y_i - \sum_{k=1, k \neq j}^{L} H_{j,k} X_k)$ and this repeats for all layers and filter coefficients are generated for each layer.

Equalized data on layer-j is $\hat{Z}_j = \hat{W}_j \times Z_j$ and similar procedure repeats for all multiplexed layers. Equalized data is further processed to decode the data.

FIG. 20 shows an illustration of grouping in MU-MIMO with 2 users each with 2 layers aligned with Multi-layer filtering method-2, in accordance with an embodiment of the present disclosure. As shown in FIG. 20, considering 8×4×2 antenna array that is 64 receive antennas. Each column with 8 vertical elements is a group and in total there are 8 groups, 4 corresponding to co-polarization and another 4 corresponding to cross-polarization. 4 layers corresponding to 2 users are alternatively assigned to 8 groups. For example, consider 8 groups {a, b, c, d, e, f, g, h}, are groups, {a, e} are assigned to layer-1 of user-1, {b, f} are assigned to layer-2 of user-2, {c, g} are assigned to layer-1 of user-1, and {d, h} are assigned to layer-2 of user-2.

In an embodiment, the RU Filtering is performed using SRS based CSI, in which the DU provides weights to the RU. The method mentioned above use either independent signaling combining e.g., DFT based beamforming of group signals or user specific filtering based on instantaneous, or slot specific measurements such as CSI or NICM of the signals of the group. A method that uses a group specific filter that is user specific and uses non-slot specific CSI measurements that are valid for longer-term e.g., 20 ms or more. The SRS signals are used, which are collected at the DU for CSI estimation of the individual users or layers, then derive the group specific filters based on a number of criteria.

SRS-based DFT weights including user-specific down tilt. The DFT Weights of an $i^{th}$ column for M antennas are given by:

$$W_i = e^{-j \frac{2\pi}{\lambda}(m-1)dzcos(\theta_{etilt}(i))}$$

where m=1 to M, and M is the number of elements in a column of an antenna array. Arranging the weights of m=1, . . . ,M into a row vector and a vector $W_i$ for the $i^{th}$ column and $\theta_{etilt}(i)$ is the tile that is applied on the "i" th group/column. Let us the inner product of Wi with the CSI of a layer as:

$$m(\theta_{etilt}(i)) = |W_i^T H_i|$$

The value of $W_i$ with specific downtilt that maximizes the metric can be applied as a user specific group filter. In principle the same set of $W_i$ can be applied over all the columns if there is a single dominant path. However, if there are significant multipath different vertical tile values one could potentially be applied for different columns. This method may result in a better performance when there is significant multi-path caused by the scattered located the base station. After group specific filtering, the second stage proceeds with conventional receivers.

One embodiment of the present disclosure is SRS based weights at the RU and DMRS based weights the DU. FIG. 21 shows an illustration of first-stage filtering at RU using SRS based weights. As illustrated in the FIG. 21, the DU estimates channel and measures covariance using FFT outputs of received SRS passed from RU. Then, DU determines set of values and pass them to RU to perform first-stage filtering. After first-stage filtering at the RU, the DU uses at least one of filtered DMRS and filtered channel estimates, and filtered interference samples passed from the RU to determine filter coefficients for second-stage filtering.

One embodiment of the present disclosure is delay in SRS based weights at the RU for first-stage filtering. FIG. 22 shows an illustration of delay introduced in the first-stage filtering when SRS based filter weights are used at the RU. Consider, $T_{CSI,SRS}$ is the time taken to compute FFT of received SRS samples at the RU and then passing the received SRS samples to the DU, and also for the DU to estimate channel and inter-layer interference plus noise covariance. Let $T_{filter,SRS}$ is the time taken for the DU to determine set of values using estimated channel and measured covariance, and then pass these set of values to the RU to perform first-stage filtering. Total delay is $T_{total,SRS} = T_{CSI,SRS} + T_{filter,SRS}$. This total delay will have significant impact in high Doppler scenarios.

One embodiment of the present disclosure is SRS based weights at the RU and DMRS based weights the DU. FIG. 23 shows an illustration of two-stage filtering using SRS based weights at the RU to perform first-stage filtering and DMRS based weights at DU to perform second-stage filtering. As illustrated in the FIG. 23, the DU estimates channel and measures covariance using FFT outputs of received SRS passed from RU. Then, DU determines set of values and pass them to RU to perform first-stage filtering. After first-stage filtering at the RU, the DU uses at least one of filtered DMRS and filtered channel estimates, and filtered interference samples passed from the RU to determine filter coefficients for second-stage filtering.

In an embodiment, if the DU performs the necessary steps of time/frequency correction, channel interpolation, then the signals received by the DU experience a different set of impairments than those received at the RU. For example:

a. The frequency selectivity of the CSI will be altered by the group specific filters of the RU. Therefore, the DU channel estimates have to take into account the type of filtering applied at the RU so that suitable DU channel estimation method can be applied.

b. The RU may have compensated for the timing and frequency errors at the group specific filtering stage. Therefore, DU either disables such compensations or applies a suitable method as appropriate. This is as shown in FIG. 24.

FIG. 24 shows a block diagram illustration of filtering using a split of the DU and the RU, in accordance with an embodiment of the present disclosure.

As shown in FIG. 24, the RU may need to communicate the type of group specific filtering applied to the DU. If RU is performing the estimation, then the RU can directly send the filtered DMRS, filtered data and filtered interference samples to the DU. Then, the DU may or may not do the channel estimation again on the samples received from RU. This may be associated with the necessary signaling between the DU and the RU. Else, the DU will receive IQ samples from the RU and then do estimation, time offset correction etc. as if fresh information is received from RU.

One embodiment of the present disclosure is user independent cell specific and group specific tilts. For users with high Doppler and for common channels, it is preferable to apply different values of user independent i.e. cell specific, downtilt values for each groups. These values can be obtained by collecting estimates of different downtilt values used by the active users and this information is collected by a scheduler or upper layers. Data analytics can be used to determine and then configure user independent i.e. cell specific, downtilt values for different groups or columns. Such methods can generate beamforming weights that adapt to changes in user movement within the cell or sector.

The group specific tilts and the weights that are computed using SRS are applicable in the downlink (DL) group specific beamforming as well. For common channel such as primary synchronization signal (PSS), secondary synchronization signal (SSS), physical broadcast channel (PBCH), physical downlink control channel (PDCCH) and even CSI-RS and for data transmission to uses with high mobility, group specific tilts and the weights can be applied.

In some embodiments, methods use the CSI and NICM of each group to obtain the group specific filter coefficients to maximize the signal level and/or reduce noise-plus-interference of the received signal in a specific slot.

Estimating SRS-CSI specific user weights: First the SRS channel estimates is obtained for the $i^{th}$ group and the channel estimates normalized with the norm of the vector channel, calculating $W_i = H_i'/norm(H_i)$. The weight can be applied as a user specific weight in a given PRB or PRG. There is a time lapse on the order of 20 ms between the calculation of SRS channel estimates and the group specific filtering operation. Assuming that $W_i$ captures the spatial characteristics of the group, it can be used as a matched filter for each PRB/PRG. Alternatively, a wideband user specific filter may also be applied where the per PRB/PRB filters are further averaged over allocated bandwidth.

In case of multiple layers SU MIMO or MU MIMO, the same set of weights may be applied to collect the signals that correspond to both layers or different weights could be applied per layer. In that case, the number of outputs per group will be increased by a factor equal to the number of layers. The DU would need to exchange the group specific filter values to the RU through ORAN messages. It is noted that PRB or PRG level indication and I/Q compression of the filter etc. need to be addressed.

Another embodiment of the present disclosure is SRS CSI based user weights, obtained from a code book. In this embodiment, a code book is stored that comprises group specific weights. Let the $j^{th}$ row vector in the $i^{th}$ group be denoted by $C_{i,j}$. Determine the $j^{th}$ entry in the $i^{th}$ code book that maximizes a metric: $|C_{i,j} H_i|$ as the group specific filter.

The code book can be determined either as a set of DFT weights parameterized with a vertical tilt or a pre-determined code book. The DU and the RU exchanges the code book as a onetime exchange for different grouping configurations and the DU indicates the entry in the code book that needs to be applied for certain group specific filtering.

In case of multiple layers SU-MIMO or MU-MIMO one could apply the same set of weights to collect the signals that correspond to both layers or different weights could be applied per layer. In that case, the number of outputs per group will be increased by a factor equal to the number of layers.

Another embodiment is SRS based RU beamforming weight calculation for multiple layers (SU and MU MIMO). Here the principles of Multi-layer filtering method-1 and computing the group specific weights using the SRS channel estimates are applied. In the method as in case of the Multi-layer filtering method-1, filter coefficients are generated specific to the detection of each layer in a group and inter-layer interference is accounted for in the covariance estimation associated with that layer. That is, for two-layer example, considering two set of filter coefficients are generated as:

$$W_{1,i} = H_{1,i}' R_{1,i}^{-1}$$

where, $W_{1,i}$ are the first stage filter coefficients corresponding to layer-1 to apply on column i of an antenna array.

$H_{1,i}$ is the channel corresponding to layer-1 on a column i.

$R_{1,i}$ is the measured interference plus noise covariance matrix corresponding to layer-1 on a column i, that is $R_{1,i} = H_{2,i} H_{2,i}' + R_{nn}$ and $R_{nn}$ is the measured covariance of inter-cell interference and noise. In the uplink, scheduling decisions change at the slot level. A user that acts as an interferer from a neighbour cell may not be the source of interference in the next slot. The source of interference in case of SRS are the users who are sounded in that SRS occasion in a neighbour cell whereas the actual source of interference for PUSCH may arise from a different set of users whose channel states will be substantially different. Therefore, the other-cell NICM i.e., $R_{nn}$ will have to be approximated as a scaled identity matrix i.e., $R_{nn} = sI$ where s is the scaling factor may be chosen based on certain criterion.

Similarly, for layer-2

$$W_{2,i} = H_{2,i}' R_{2,i}^{-1}$$

where, $W_{2,i}$ are the first stage filter coefficients corresponding to layer-2 to apply on column i of an antenna array.

$H_{2,i}$ is the channel corresponding to layer-2 on a column i of an antenna array.

$R_{2,i}$ is the measured interference plus noise covariance matrix corresponding to layer-2, that is $R_{2,i} = H_{1,i} H_{1,i}' + sI$.

This method can be generalized to more than 2-layer scenario by accounting for the self-interference arising from other layers appropriately. In this scenario, the number of group specific filtered data streams increase by a factor equal to the number of layers. The RU will have to transmit these additional group specific filtered data streams along with the additional group specific filtered reference streams to the DU. Also, pre-whitening by inverting NICM on SRS can be disabled optionally if in case self-interference at the is not to be cancelled.

In another embodiment of the present disclosure, a sub-optimal SRS based alternative that uses with one filter/group for all layers. In this method, it is considered grouping of all column antennas of a given polarization. There are 4 columns for co-pol denoted as [a, b, c, d] and another 4 for cross-pol denoted as [e, f, g, h]. The group specific filer for group {a} will be one that matches to the first layer and strives to eliminate interference caused by the second layer:

$$W_{1,i} = H_{1,i}' R_{1,i}^{-1}$$

For group {b}, a is applied that matches to the second layer and strives to eliminate interference caused by the first layer:

$$W_{2,i} = H_{2,i}' R_{2,i}^{-1}$$

Likewise, {c} uses a filter matched to the first layer and {d} uses one that is matched to the second layer. The same approach is followed for the cross-pol groups where a matched filter matched with any one layer is applied, but alternates between adjacent columns. This method can be further generalized for more layers.

Common channels such as PRACH and PUCCH format-0 cannot employ user specific group filters. For common channels, one should apply user independent weights. They can be group specific weights i.e. each column can have different weights. Such an implementation allows group specific beams that are oriented in specific directions (in election or azimuth or a combination) and allows the base station to enhance the overall performance by tailoring the beams in the direction of user traffic.

However, if PRACH or PUCCH format-0 or any other control channel transmissions are associated with PUSCH transmission, then the same group specific filter that is applied for PUSCH can be applied for these channels.

(a) Common channel requires user independent weights; one possibility is as the follows:

(a.1) Apply different vertical tilts on each vertical column, then treat each tilt independently, then identify performance on each of them based on either SRS channel estimates. At one time, the gNB can apply 8 different tilts using 8 columns (4 H and 4 V) or N columns based on M, N, P configuration, or the gNB can use the same tilt on V and H of 1 column and combine them.

(a.2) This can be called a calibration phase. Feed this to the SON/protocol stack which can use RSRP measurements etc. to identify assuming traffic is there. This can be used for identifying the semi-static beamforming.

(a.3) This can be used on DL, based on DL measurements, such as the cell-splitting approach, the DFT weights identified may be used on horizontal or vertical.

FIG. 25 shows an illustration of a method using SRS from multiple users, in accordance with an embodiment of the present disclosure. As shown in the FIG. 25, the method includes the SRS comes from one user, the gNB can hypothesize many tilts/many beams, and find the best beam for that user. Then repeat for each user over time. Thereafter, finding an appropriate set of receiver common beam patterns for PRACH/PUCCH based on the per-UE beam pattern i.e. per UE SRS measurements, and determine the right beam based on all UE's measurements.

FIG. 26 shows a flowchart illustrating method of received signal processing by a massive multiple input multiple output (MIMO) base station (BS), in accordance with an alternative embodiments of the present disclosure.

As illustrated in FIG. 26, the method 2600 comprises one or more blocks for processing received signal by a massive multiple input multiple output (MIMO) base station (BS). The massive MIMO BS comprises a plurality of antennas, at least one radio unit (RU), at least one distributed unit (DU), an interface configured for a communication between the at least one RU and the at least one DU The method 2600 may be described in the general context of computer executable instructions. Generally, computer executable instructions can include routines, programs, objects, components, data structures, procedures, modules, and functions, which perform functions or implement abstract data types.

The order in which the method 2600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 2610, the method comprises receiving, by the at least one RU, a plurality of signals corresponding to the plurality of antennas. The plurality of signals comprises at least one of data signals, demodulation reference signals (DMRS) and sounding reference signals (SRS).

At block 2620, grouping a subset of the plurality of signals corresponding to a subset of antennas to a group, to generate a plurality of signal groups. The signals associated with each group is at least one of the data signals, the DMRS and the SRS. The grouping is performed by the at least one RU and the at least one DU. Also, the signals associated with each of the plurality of signal groups comprises at least one user, said at least one user has at least one layer.

At block 2630, a first stage filtering is performed, by the RU, on the plurality of signal groups associated with each group using one or more group specific filters to obtain one or more group specific filtered signals. The group specific filters are determined using at least one of the signals associated with the group, and a set of values communicated by the DU to the RU, wherein said set of values are determined by the DU based on SRS or predetermined values. Each one of the one or more group specific filters of a group is associated with a subset of users and a subset of layers associated with a subset of users; wherein union of said subsets of users and said subsets of layers comprises the set of all the users and all the layers associated with the plurality of signals.

The set of values are determined by the DU based on the SRS, are associated with a subset of users and a subset of layers. The one or more group specific signals of a group are weighed and combined using the set of values to obtain one or more group specific filtered signals. The set of values are communicated by the DU to the RU through the interface. Each one of the one or more group specific filters associated with a user and a layer is obtained using an estimated CSI associated with said user and said layer; and at least an explicit interference covariance associated with the remaining users and remaining layers.

Also, each one of the one or more group specific filters of a group comprises of weights, said weights are determined by the RU based on the DMRS. The weights are associated with a subset of users and a subset of layers, wherein one or more group specific signals of a group are weighed and combined using said weights to obtain one or more group specific filtered signals.

Each one of the one or more group specific filters associated with a user and a layer is obtained using one of a group specific, a user specific and a layer specific matched filter; a group specific, a user specific and a layer specific minimum mean square error (MMSE) filter; and a group specific, a user specific and a layer specific MMSE Interference Rejection Combining (IRC) filter. In an embodiment, each one of the one or more group specific filters is a matched filter. The matched filter is associated with one user and one layer, wherein union of said user and said layer comprises a set of all the users and all the layers associated with the plurality of signals. The matched filter weights are determined using one of the SRS and the DMRS.

At block 2640, a second stage filtering is performed by the DU on the one or more group specific filtered signals associated with a plurality of the signal groups to obtain one or more second stage filtered signals. The second stage filtering is performed by one or more second stage filters, wherein each of the one or more second stage filters and each of the one or more second stage filtered signals are associated with a user and a layer. Each of the one or more second stage filters are associated with at least one of an estimated second stage CSI associated and a measured second stage interference covariance. Each of the one or more second stage filters are one of a second stage matched filter, a second stage MMSE filter, and a second stage MMSE-IRC filter.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

We claim:

1. A method of received signal processing by a massive multiple input multiple output (M IMO) base station (BS), said massive MIMO BS comprises a plurality of antennas, at least one radio unit (RU), at least one distributed unit (DU), an interface configured for a communication between the at least one RU and the at least one DU, the method comprising:

processing, via the massive MIMO BS, by:

receiving, by the at least one RU, a plurality of signals corresponding to the plurality of antennas, wherein the plurality of signals comprises at least one of data signals, demodulation reference signals (DMRS) and sounding reference signals (SRS);

grouping, by the at least one RU and the at least one DU, a subset of the plurality of signals corresponding to a subset of antennas to a group, to generate a plurality of signal groups, wherein signals associated with each group are at least one of the data signals, the DM RS and the SRS;

performing a first stage filtering, by the at least one RU, on the plurality of signal groups associated with each group using one or more group specific filters to generate one or more group specific filtered signals, wherein the group specific filters are determined using signals associated with the group and/or a set of values communicated by the at least one DU to the at least one RU, and wherein the set of values are determined by the at least one DU based on SRS or predetermined values; and communicating the one or more group specific filtered signals from the at least one RU to the at least one DU though the interface.

2. The method as claimed in claim 1, wherein the grouping is performed on the subset of the plurality of signals corresponding to the subset of antennas to the group, the subset of antennas is associated with an antenna array, the grouping comprises at least one of grouping vertical elements associated with the subset of antennas in the antenna array, grouping polarization elements associated with the subset of antennas, and grouping a subset of the received plurality of signals corresponding to a distinct set of antennas.

3. The method as claimed in claim 1, wherein the method comprises performing equalization, by the at least one DU, on the one or more group specific filtered signals using one of linear equalizer and a non-linear equalizer.

4. The method as claimed in claim 3, wherein a second stage filtering is performed at the at least one DU to equalize the one or more group specific filtered signals received from the at least one RU, to obtain equalized data.

5. The method as claimed in claim 4, wherein the second stage filtering is performed by one or more second stage filters, wherein each of the one or more second stage filters and each of the one or more second stage filtered signals are associated with a user and a layer.

6. The method as claimed in claim 5, wherein each of the one or more second stage filters is associated with at least one of an estimated second stage CSI and a measured second stage interference covariance.

7. The method as claimed in claim 5, wherein each of the one or more second stage filters is one of a second stage matched filter, a second stage MMSE filter, and a second stage MMSE-IRC filter.

8. The method as claimed in claim 6, wherein the estimated second stage CSI and the measured second stage interference covariance are obtained using a group specific filtered DMRS.

9. The method as claimed in claim 6, wherein the estimated second stage CSI is obtained from one or more group specific filtered CSI, the measured second stage interference covariance is obtained from one or more group specific filtered interference plus noise signals.

10. The method as claimed in claim 4, wherein the first stage filtering and the second stage filtering are performed in the at least one RU and the at least one DU respectively, wherein the at least one RU and the at least one DU are co-located.

11. The method as claimed in claim 1, wherein the method comprises a signalling of information from the at least one RU to the at least one DU, the information is at least one of a filtered data, a filtered DM RS, a quality metric, a filtered channel state information (CSI), and one or more filtered interference samples.

12. The method as claimed in claim 1, wherein the signals associated with each of the plurality of signal groups comprises at least one user, the at least one user has at least one layer.

13. The method as claimed in claim 1, wherein each one of the one or more group specific filters of a group is associated with a subset of users and a subset of layers associated with the subset of users; wherein union of the subsets of users and the subsets of layers comprises the set of all the users and all the layers associated with the plurality of signals.

14. The method as claimed in claim 13, wherein the one or more group specific filters of the group is associated with a single user and one of multiple layers of the single user.

15. The method as claimed in claim 13, wherein the one or more group specific filters of the group is associated with one of multiple users and one of multiple layers of the one of multiple users.

16. The method as claimed in claim 13, wherein the set of values, determined by the at least one DU based on the SRS, are associated with a subset of users and a subset of layers, wherein one or more group specific signals of the group are weighed and combined using the set of values to obtain one or more group specific filtered signals.

17. The method as claimed in claim 16, wherein the set of values are communicated by the at least one DU to the at least one RU through the interface.

18. The method as claimed in claim 16, wherein each one of the one or more group specific filters associated with a user and a layer is obtained using an estimated channel state information (CSI) associated with the user and the layer; and at least an explicit interference covariance associated with remaining users and remaining layers.

19. The method as claimed in claim 13, wherein each one of the one or more group specific filters of the group comprises of weights, the weights are determined by the at least one RU based on the DM RS, wherein the weights are associated with a subset of users and a subset of layers, wherein one or more group specific signals of the group are weighed and combined using the weights to obtain one or more group specific filtered signals.

20. The method as claimed in claim 1, wherein each one of the one or more group specific filters is determined at the at least one RU using at least one of estimated channel state information (CSI) associated with a group, and measured interference plus noise covariance associated with the group, wherein the estimated CSI associated with the group, and measured interference plus noise covariance associated with the group are measured using the DM RS associated with the group.

21. The method as claimed in claim 1, wherein the grouping operation performed in the at least one RU and the at least one DU is same.

22. The method as claimed in claim 1, wherein the predetermined values are obtained using group specific Discrete Fourier Transform (DFT) weights, the group specific DFT weights include a group specific steering angle.

23. The method as claimed in claim 1, wherein the predetermined values are obtained using one or more group specific weights that are selected from a code book.

24. The method as claimed in claim 1, wherein each one of the one or more group specific filters associated with a user and a layer is obtained using one of a group specific matched filter, a user specific matched filter and a layer specific matched filter; a group specific minimum mean square error (MMSE) filter, a user specific minimum mean square error (MMSE) filter and a layer specific minimum mean square error (MMSE) filter; and a group specific MMSE Interference Rejection Combining (IRC) filter, a user specific MMSE Interference Rejection Combining (IRC) filter and a layer specific MMSE Interference Rejection Combining (IRC) filter.

25. The method as claimed in claim 1, wherein each one of the one or more group specific filters is a matched filter, the matched filter is associated with one user and one layer, wherein union of the user and the layer comprises a set of all the users and all the layers associated with the plurality of signals.

26. The method as claimed in claim 25, wherein matched filter weights are determined using one of the SRS and the DMRS.

27. The method as claimed in claim 1, wherein the one or more group specific filtered signals comprises one or more group specific filtered data signals, one or more group specific filtered DMRS, one or more group specific filtered CSI, and one or more group specific filtered interference plus noise signals.

28. The method as claimed in claim 1, wherein the interface is a fronthaul interface.

29. The method as claimed in claim 1, wherein the first stage filtering and the second stage filtering are performed in the at least one RU and the at least one DU respectively, wherein the at least one RU and the at least one DU are co-located.

30. A method of processing, the method comprising:
processing, via a base station (BS), by:
receiving a plurality of signals corresponding to a plurality of antennas, wherein the plurality of signals comprise data signals, demodulation reference signals (DM RS) and sounding reference signals (SRS);
grouping subsets of the plurality of signals to generate a plurality of signal groups;
filtering each of the plurality of signal groups using one or more group specific filters to obtain one or more group specific filtered signals, wherein a group specific filter for a particular signal group is determined according to signals associated with the particular signal group and/or the SRS; and
weighting and combining the one or more group specific signals of a signal group.

31. The method as claimed in claim 30, wherein:
the signals associated with each of the plurality of signal groups comprises at least one user, and
the at least one user has at least one layer.

32. A base station (BS), the BS comprising:
a receiver configured to receive a plurality of signals corresponding to a plurality of antennas, wherein the plurality of signals comprise data signals, demodulation reference signals (DM RS) and sounding reference signals (SRS);
a processor configured to group subsets of the plurality of signals to generate a plurality of signal groups; and
one or more group specific filters configured to filter each of the plurality of signal groups to obtain one or more group specific filtered signals, wherein a group specific filter for a particular signal group is determined according to signals associated with the particular signal group and/or the SRS, wherein:
the group specific filter for the particular signal group is determined according to predetermined values obtained using one or more group specific Discrete Fourier Transform (DFT) weights, and
the group specific DFT weights include a group specific steering angle.

33. A base station (BS), the BS comprising:
a receiver configured to receive a plurality of signals corresponding to a plurality of antennas, wherein the plurality of signals comprise data signals, demodulation reference signals (DM RS) and sounding reference signals (SRS);
a processor configured to group subsets of the plurality of signals to generate a plurality of signal groups; and
one or more group specific filters configured to filter each of the plurality of signal groups to obtain one or more group specific filtered signals, wherein a group specific filter for a particular signal group is determined according to signals associated with the particular signal group and/or the SRS, wherein:
the group specific filter for the particular signal group is determined according to predetermined values obtained using one or more group specific weights that are selected from a code book.

34. A base station (BS), the BS comprising:
a receiver configured to receive a plurality of signals corresponding to a plurality of antennas, wherein the plurality of signals comprise data signals, demodulation reference signals (DMRS) and sounding reference signals (SRS);
a processor configured to group subsets of the plurality of signals to generate a plurality of signal groups; and
one or more group specific filters configured to filter each of the plurality of signal groups to obtain one or more group specific filtered signals, wherein a group specific filter for a particular signal group is determined according to signals associated with the particular signal group and/or the SRS, wherein:
each one of the one or more group specific filters associated with a user and a layer is obtained using one of a group specific matched filter, a user specific matched filter, a layer specific matched filter, a group specific minimum mean square error (MMSE) filter, a user specific MMSE filter, a layer specific MMSE filter, a group specific MMSE Interference Rejection Combining (IRC) filter, a user specific MMSE IRC filter and a layer specific MMSE IRC filter.

35. A base station (BS), the BS comprising:
a receiver configured to receive a plurality of signals corresponding to a plurality of antennas, wherein the plurality of signals comprise data signals, demodulation reference signals (DMRS) and sounding reference signals (SRS);
a processor configured to group subsets of the plurality of signals to generate a plurality of signal groups; and
one or more group specific filters configured to filter each of the plurality of signal groups to obtain one or more group specific filtered signals, wherein a group specific filter for a particular signal group is determined according to signals associated with the particular signal group and/or the SRS, wherein:
each one of the one or more group specific filters is a matched filter,
the matched filter is associated with one user and one layer, and
the union of users and layers of all matched filters comprises a set of all the users and all the layers associated with the plurality of signals.

36. A base station (BS), the BS comprising:
a receiver configured to receive a plurality of signals corresponding to a plurality of antennas, wherein the plurality of signals comprise data signals, demodulation reference signals (DMRS) and sounding reference signals (SRS);
a processor configured to group subsets of the plurality of signals to generate a plurality of signal groups; and
one or more group specific filters configured to filter each of the plurality of signal groups to obtain one or more group specific filtered signals, wherein a group specific filter for a particular signal group is determined according to signals associated with the particular signal group and/or the SRS, wherein:
each one of the one or more group specific filters is a matched filter, and
weights of the matched filter are determined using one of the SRS and the DMRS.

37. A method of processing, the method comprising:
processing, via a base station (BS), by:
receiving a plurality of signals corresponding to a plurality of antennas, wherein the plurality of signals comprise data signals, demodulation reference signals (DMRS) and sounding reference signals (SRS);
grouping subsets of the plurality of signals to generate a plurality of signal groups; and
filtering each of the plurality of signal groups using one or more group specific filters to obtain one or more group specific filtered signals, wherein a group specific filter for a particular signal group is determined according to signals associated with the particular signal group and/or the SRS, wherein:
each one of the one or more group specific filters of the particular signal group comprises weights,
the weights are determined according to the DMRS,
the weights are associated with a subset of users and a subset of layers, and
one or more group specific signals of the particular signal group are weighted and combined using the weights to obtain one or more group specific filtered signals.

38. A method of processing, the method comprising:
processing, via a base station (BS), by:
receiving a plurality of signals corresponding to a plurality of antennas, wherein the plurality of signals comprise data signals, demodulation reference signals (DM RS) and sounding reference signals (SRS);
grouping subsets of the plurality of signals to generate a plurality of signal groups; and
filtering each of the plurality of signal groups using one or more group specific filters to obtain one or more group specific filtered signals, wherein a group specific filter for a particular signal group is determined according to signals associated with the particular signal group and/or the SRS, wherein:
the group specific filter for the particular signal group is determined according to predetermined values obtained using one or more group specific Discrete Fourier Transform (DFT) weights, and
the group specific DFT weights include a group specific steering angle.

39. A method of processing, the method comprising:
processing, via a base station (BS), by:
receiving a plurality of signals corresponding to a plurality of antennas, wherein the plurality of signals comprise data signals, demodulation reference signals (DM RS) and sounding reference signals (SRS);
grouping subsets of the plurality of signals to generate a plurality of signal groups; and
filtering each of the plurality of signal groups using one or more group specific filters to obtain one or more group specific filtered signals, wherein a group specific filter for a particular signal group is determined according to signals associated with the particular signal group and/or the SRS, wherein:
the group specific filter for the particular signal group is determined according to predetermined values obtained using one or more group specific weights that are selected from a code book.

* * * * *